(12) United States Patent
Sethumadhavan et al.

(10) Patent No.: US 11,500,785 B2
(45) Date of Patent: Nov. 15, 2022

(54) SYSTEMS AND METHODS FOR MEMORY SAFETY WITH RANDOM EMBEDDED SECRET TOKENS

(71) Applicant: The Trustees of Columbia University in the City of New York, New York, NY (US)

(72) Inventors: Lakshminarasimhan Sethumadhavan, Niskayuna, NY (US); Kanad Sinha, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 902 days.

(21) Appl. No.: 16/124,474

(22) Filed: Sep. 7, 2018

(65) Prior Publication Data
US 2020/0026665 A1      Jan. 23, 2020

Related U.S. Application Data

(60) Provisional application No. 62/555,749, filed on Sep. 8, 2017.

(51) Int. Cl.
*G06F 12/14*     (2006.01)
*G06F 13/16*     (2006.01)
(Continued)

(52) U.S. Cl.
CPC ........ *G06F 12/1408* (2013.01); *G06F 12/084* (2013.01); *G06F 12/0811* (2013.01); *G06F 13/1668* (2013.01)

(58) Field of Classification Search
CPC ............. G06F 12/1408; G06F 12/0811; G06F 12/0821; G06F 13/1668
See application file for complete search history.

(56) References Cited

U.S. PATENT DOCUMENTS 7,711,988 B2     5/2010 Zhou et al.
2007/0234296 A1  10/2007 Zorn et al.
(Continued)

FOREIGN PATENT DOCUMENTS

WO     2017/030805 A1    2/2017

OTHER PUBLICATIONS

D. Weston and M. Miller, "Windows 10 mitigation improvements," in Black Hat USA, 2016.
(Continued)

*Primary Examiner* — Paul E Callahan
(74) *Attorney, Agent, or Firm* — Occhiuti & Rohlicek LLP

(57) ABSTRACT

Disclosed are devices, systems, apparatus, circuits, methods, products, and other implementations, including a method that includes obtaining, during execution of a process associated with a particular privilege level, data content from a memory location, and determining by a hardware-based detection circuit whether the data content matches at least one of one or more token values, with the one or more token values stored in one or more pre-determined memory locations, and with access of any of the pre-determined one or more memory locations indicating a potential anomalous condition. The method further includes triggering, in response to a determination that the data content matches the at least one of the one or more token values, another process with a higher or same privilege level as the particular privilege level associated with the process, to handle occurrence of a potential system violation condition.

44 Claims, 9 Drawing Sheets

(51) Int. Cl.
G06F 12/084 (2016.01)
G06F 12/0811 (2016.01)

(56) References Cited

U.S. PATENT DOCUMENTS

| | | | |
|---|---|---|---|
| 2009/0249289 A1 | 10/2009 | Akritidis et al. | |
| 2011/0099335 A1 | 4/2011 | Scott et al. | |
| 2016/0119148 A1 | 4/2016 | Ghose | |
| 2017/0083255 A1 | 3/2017 | Chiricescu et al. | |
| 2018/0247057 A1* | 8/2018 | Melski | G06F 12/023 |

OTHER PUBLICATIONS

J. Devietti, C. Blundell, M. M. K. Martin, and S. Zdancewic, "Hardbound: Architectural support for spatial safety of the C programming language," in Proceedings of the 13th International Conference on Ar chitectural Support for Programming Languages and Operating Systems (ASPLOS), 2008.
S. Ghose, L. Gilgeous, P. Dudnik, A. Aggarwal, and C. Waxman,"Architectural support for low overhead detection of memory violations," in 2009 Design, Automation Test in Europe Conference Exhibition, 2009.
S. Nagarakatte, M. M. K. Martin, and S. Zdancewic, "Watchdog: Hardware for safe and secure manual memory management and full memory safety," in 39th International Symposium on Computer Architecture (ISCA), 2012.
S. Nagarakatte, M. Martin, and S. Zdancewic, "WatchdogLite: Hardware-accelerated compiler-based pointer checking," in Proceedings of Annual IEEE/ACM International Symposium on Code Generation and Optimization (CGO), 2014.
J. Woodruff, R. N. Watson, D. Chisnall, S. W. Moore, J. Anderson, B. Davis, B. Davis, B. Laurie, P. G. Neumann, R. Norton, and M. Roe, "The CHERI capability model: Revisiting RISC in an age of risk," in Proceeding of the 41st Annual International Symposium on Computer Architecuture (ISCA), 2014.
Intel Corporation, "Intel architecture instruction set extensions programming reference."
D. Chisnall, C. Rothwell, R. N. Watson, J. Woodruff, M. Vadera, S. W. Moore, M. Roe, B. Davis, and P. G. Neumann, "Beyond the PDP-11: Architectural support for a memory-safe C abstract machine," in Proceedings of the Twentieth International Conference on Architectural Support for Programming Languages and Operating Systems (ASPLOS), 2015.
F. Qin, S. Lu, and Y. Zhou, "SafeMem: Exploiting ECC-memory for detecting memory leaks and memory corruption during production runs," in Proceedings of the 11th International Symposium on High-Performance Computer Architecture (HPCA), 2005.
C. Song, H. Moon, M. Alam, I. Yun, B. Lee, T. Kim, W. Lee, and Y. Paek, "HDFI: Hardware-assisted data-flow isolation," in 2016 IEEE Symposium on Security and Privacy (SP), 2016. [11] K. Serebryany, D. Bruening, A. Potapenko, and D. Vyukov, "Address-Sanitizer: A fast address sanity checker," in Proceedings of the 2012 USENIX Conference on Annual Technical Conference (Usenix ATC), 2012.
"Chromium project: Addresssanitizer," https://www.chromium.org/developers/testing/addresssanitizer.
"CVE-2014-0160," h t t p s : //c v e.mi t r e.o r g/c g i -b i n/c v e n ame.c g i? name=CVE-2014-0160, 2014.
"AddressSanitizer in hardware," https://github.com/google/sanitizers/wiki/AddressSanitizerInHardware.
"AddressSanitizer Algorithm," https://github.com/google/sanitizers/wiki/AddressSanitizerAlgorithm.
K. Lu, C. Song, T. Kim, and W. Lee, Unisan: Proactive kernel memory hoACM SIGSAC Conference on Computer and Communications Security (CCS), 2016.
J. Wagner, V. Kuznetsov, G. Candea, and J. Kinder, "High systemcode security with low overhead," in Proceedings of the 2015 IEEE Symposium on Security and Privacy (SP), 2015.
E. D. Berger and B. G. Zorn, "DieHard: Probabilistic memory safety for unsafe languages," in Proceedings of the 27th ACM SIGPLAN Conference on Programming Language Design and Implementation (PLDI), 2006.
G. Novark and E. D. Berger, "DieHarder: Securing the heap," in Proceedings of the 17th ACM Conference on Computer and Communications Security (CCS), 2010.
V. Pappas, M. Polychronakis, and A. D. Keromytis, "Smashing the Gadgets: Hindering Return-Oriented Programming Using in-place Code Randomization," in Proceedings of the 2012 IEEE Symposium on Security and Privacy, 2012.
X. Chen, A. Slowinska, D. Andriesse, H. Bos, and C. Giuffrida, "StackArmor: Comprehensive protection from stack-based memory error vulnerabilities for binaries." in Proceedings of the Network and Dis-tributed System Security Symposium (NDSS), 2015.
N. Nethercote and J. Seward, "Valgrind: A framework for heavyweight dynamic binary instrumentation," in Proceedings of the 28th ACM SIGPLAN Conference on Programming Language Design and Imple-mentation (PLDI), 2007.
N. Binkert, B. Beckmann, G. Black, S. K. Reinhardt, A. Saidi, A. Basu, J. Hestness, D. R. Hower, T. Krishna, S. Sardashti, R. Sen, K. Sewell, M. Shoaib, N. Vaish, M. D. Hill, and D. A. Wood, "The gem5 simulator," SIGARCH Computer Architecture News, 2011.
L. K. John, "More on finding a single number to indicate overall performance of a benchmark suite," SIGARCH Comput. Archit. News, 2004.
Hardware-assisted checking using Silicon Secured Memory (SSM), https://docs.oracle.com/cd/E37069_01/html/E37085/gphwb.html, 2015.
P. Zhou, F. Qin, W. Liu, Y. Zhou, and J. Torrellas, "Efficient and Flexible Architectural Support for Dynamic Monitoring," ACM Transactions on architecture and Code Optimization, Mar. 2005.
J. L. Greathouse, H. Xin, Y. Luo, and T. Austin, "A case for unlimited watchpoints," in Proceedings of the Seventeenth International Conference on Architectural Support for Programming Languages and Operating Systems (ASPLOS), 2012.
G. Venkataramani, B. Roemer, Y. Solihin, and M. Prvulovic, "MemTracker: Efficient and programmable support for memory access monitoring and debugging (hpca)," in 2007 IEEE 13th International Sympo-sium on High Performance Computer Architecture, 2007.
L. Szekeres, M. Payer, T. Wei, and D. Song, "SoK: Eternal war in memory," in Proceedings of the 2013 IEEE Symposium on Security and Privacy (SP), 2013.
T. Jim, J. G. Morrisett, D. Grossman, M. W. Hicks, J. Cheney, and Y. Wang, "Cyclone: A safe dialect of C," in Proceedings of the General Track of the Annual Conference on USENIX Annual Technical Conference (Usenix ATC), 2002.
G. C. Necula, J. Condit, M. Harren, S. McPeak, and W. Weimer, "CCured: Type-safe retrofitting of legacy software," ACM Transactions Programming Language Systems, 2005.
S. Nagarakatte, J. Zhao, M. M. Martin, and S. Zdancewic, "SoftBound: Highly compatible and complete spatial memory safety for c," in Proceedings of the 30th ACM SIGPLAN Conference on Programming Language Design and Implementation (PLDI), 2009.
O. Oleksenko, D. Kuvaiskii, P. Bhatotia, P. Felber, and C. Fetzer, "Intel MPX explained: An empirical study of intel MPX and software-based bounds checking approaches," CoRR, 2017.
A. Sotirov, "Heap feng shui in JavaScript," in Black Hat Europe, 2007.
L. Vilanova, M. Ben-Yehuda, N. Navarro, Y. Etsion, and M. Valero, "CODOMs: Protecting software with code-centric memory domains," in Proceeding of the 41st Annual International Symposium on Computer Architecuture (ISCA), 2014.
D. Chisnall, B. Davis, K. Gudka, D. Brazdil, A. Joannou, J. Woodruff, A. T. Markettos, J. E. Maste, R. Norton, S. Son, M. Roe, S. W. Moore, P. G. Neumann, B. Laurie, and R. N. Watson, "CHERI JNI: Sinking the Java security model into the C," in Proceedings of the Twenty-Second International Conference on Architectural Support for Programming Languages and Operating Systems (ASPLOS), 2017.
Andrea Bittau, Adam Belay, Ali Mashtizadeh, David Mazieres, and Dan Boneh. Hacking blind. In Proceedings of the 2014 IEEE Symposium on Security and Privacy, SP '14, 2014.

(56) References Cited

OTHER PUBLICATIONS

Qualcomm Technologies Inc. Pointer authentication on armv8.3, 2017.
Theofilos Petsios, Vasileios P. Kemerlis, Michalis Polychronakis, and Angelos D. Keromytis. Dynaguard: Armoring canary-based protections against brute-force attacks. In Proceedings of the 31st Annual Computer Security Applications Conference, ACSAC 2015, 2015.
Konstantin Serebryany, Derek Bruening, Alexander Potapenko, and Dmitry Vyukov. Addresssanitizer: A fast address sanity checker. In Proceedings of the 2012 USENIX Conference on Annual Technical Conference, USENIX ATC'12, 2012.
DavidWeston, Matt Miller, and Tim Rains. Exploitation trends: From potential risk to actual risk. In RSA Conference, 2015.
"Firefox and address sanitizer," https://developer.mozilla.org/en-US/docs/Mozilla/Testing/Firefox_and_Address_Sanitizer.
Qualcomm Technologies Inc., "Pointer authentication on ARMv8.3," https://www.qualcomm.com/media/documents/files/whitepaper-pointerauthentication-on-armv8-3.pdf, 2017.

* cited by examiner

SYSTEMS AND METHODS FOR MEMORY SAFETY WITH RANDOM EMBEDDED SECRET TOKENS

CROSS-REFERENCE TO RELATED APPLICATIONS

This application claims the benefit of U.S. Provisional Application No. 62/555,749, entitled "SYSTEMS AND METHODS FOR MEMORY SAFETY WITH RANDOM EMBEDDED SECRET TOKENS" and filed Sep. 8, 2017, the content of which is incorporated herein by reference in its entirety.

STATEMENT REGARDING FEDERALLY SPONSORED RESEARCH

This invention was made with government support under N00014-15-1-2173 awarded by the Office of Naval Research (ONR), and by contract number HR0011-18-C-0017 awarded by the Defense Advanced Research Projects Agency (DARPA). The government has certain rights in the invention.

BACKGROUND

Memory corruption errors have been one of the most persistent problems in computer security. Heap-based memory attacks (heap corruption and use-after-free bugs) alone accounted for more than 80% of root causes that led to remote code execution in Microsoft software in 2015.

Previous hardware techniques to address memory safety concerns broadly fall into two main categories—ones that whitelist safe memory regions and ones that blacklist unsafe memory regions. Previous work in former approach, broadly referred to as bounds-checking, associates metadata with every pointer indicating the bounds of the data structure it can legitimately access, and flagging any access outside those bounds as memory errors. In the latter approach, commonly called the tripwire approach, critical locations in the address space are marked invalid (for instance, both ends of an array) and any access to these locations raises a memory-violation exception.

SUMMARY

Disclosed are systems and methods to implement a tripwire-based approach to mitigate security and reliability concerns due to memory safety violations. In some of the implementations, referred to as Random Embedded Secret Tokens (REST) approach, a hardware primitive is provided to perform content based checks to mitigate common types of spatial and temporal memory errors at very low cost. The content check is performed to determine if certain memory location match one of one or more pre-determined (optionally random or pseudorandom) value(s) that has/have been embedded into memory locations. To provide memory safety, REST is used to bookend data structures during allocation. If the hardware accesses a REST value during execution, due to programming errors or adversarial actions, it reports a privileged memory safety exception.

In some variations, a method is provided that includes obtaining, during execution of a process associated with a particular privilege level, data content from a memory location, and determining by a hardware-based detection circuit whether the data content matches at least one of one or more token values, with the one or more token values stored in one or more pre-determined memory locations, and with access of any of the pre-determined one or more memory locations indicating a potential anomalous condition. The method further includes triggering, in response to a determination that the data content matches the at least one of the one or more token values, another process with a higher or same privilege level as the particular privilege level associated with the process, to handle occurrence of a potential system violation condition.

Embodiments of the method may include at least some of the features described in the present disclosure, including one or more of the following features.

Triggering the other process may include communicating to the other process information about access of the memory location, including one or more of, for example, a program counter value, timing information for the access of the memory location, and/or other information.

Determining whether the data content matches at least one of one or more token values may include setting, in response to a determination of a match of the data content to the at least one of the one or more token values, a token indicator of at least one cache memory location, or a part thereof, storing the obtained data content to an indicator value indicating the at least one cache memory location, or part thereof, stores a token value.

Triggering the other process may include generating a memory exception condition in response to determining that the token indicator of the at least one cache memory location storing the data content is set to the indicator value indicating the at least one cache memory location stores the token value.

The token indicator of the at least one cache memory location may include a token bit.

The at least one of one or more token values may be a value represented by a multiplier of a number of bits in a cache memory location of a cache memory executing the particular process and the other process.

Determining by the hardware-based detection circuit whether the data content matches the at least one of one or more token values may include comparing, by the hardware-based detection circuit, the data content to the one or more token values stored in one or more hardware registers accessible by the hardware-based detection circuit.

Determining whether the data content matches the at least one of one or more token values may include comparing portions of the data content to respective portions the at least one of the one or more token values over multiple clock cycles.

The hardware-based detection circuit may be located at an interface between an L1 data cache memory and another memory device. The other memory device may include one of, for example, an L2 cache memory, or non-cache memory.

At least one of the pre-determined one or more memory locations may be outside a boundary of a process-accessible data structure.

The method may further include executing an arm instruction to write at least some of the one or more token values into the pre-determined one or more memory locations.

The method may further include randomly determining at least some of the pre-determined one or more memory locations into which to write at least some of the one or more token values.

At least some of the one or more token values may include randomized-generated values.

The method may further include regenerating, by the triggered other process, a new token value, and replacing content of the memory location that included the at least one of the one or more token values with the regenerated new token value.

In some variations, a computing system is provided that includes one or more memory devices, a controller configured to obtain, during execution of a process associated with a particular privilege level, data content from a memory location at the one or more memory devices, and a hardware-based detection circuit configured to determine whether the data content obtained from the memory location matches at least one of one or more token values, with the one or more token values stored in one or more pre-determined memory locations at the one or more memory devices, and with access of any of the pre-determined one or more memory locations indicating a potential anomalous condition. The controller is further configured to trigger, in response to a determination that the data content matches the at least one of the one or more token values, another process with a higher or same privilege level as the particular privilege level associated with the process, to handle occurrence of a potential system violation condition.

Embodiments of the computing system may include at least some of the features described in the present disclosure, including at least some of the features described above in relation to the method, as well as one or more of the following features.

The hardware-based detection circuit configured to determine whether the data content matches at least one of one or more token values may be configured to set a token indicator of at least one cache memory location storing the obtained data content, to an indicator value indicating the at least one cache memory location stores a token value.

The controller may further be configured to generate a memory exception condition in response to determining that the token indicator of the at least one cache memory location storing the data content is set to the indicator value indicating the at least one cache memory location stores the token value.

The hardware-based detection circuit may be located at an interface between an L1 data cache memory and another memory device, with the other memory device including one of, for example an L2 cache memory, or non-cache memory.

At least one of the pre-determined one or more memory locations may be outside a boundary of a process-accessible data structure.

The controller may further be configured to execute arm instructions to write at least some of the one or more token values into the pre-determined one or more memory locations.

The controller may include a load-store queue (LSQ) circuit configured to trigger an exception condition upon determination that an arm instruction to one of the pre-determined one or more memory location is executed substantially at the same time as a read operation from the one of the pre-determined one or more memory locations.

The controller may further be configured to randomly determine at least some of the pre-determined one or more memory locations into which to write at least some of the one or more token values.

The at least some of the one or more token values may include randomized-generated values stored in one or more registers accessible by the detection circuit.

The controller may be configured to serialize performance of arm and disarm instructions controlling the placement of the one or more token values in the one or more pre-determined memory locations at the one or more memory devices such that a particular arm or disarm instruction cannot begin execution until all preceding instructions have been completed, and no new instruction can begin execution until performance of the particular arm or disarm instruction has been completed.

In some variations, a non-transitory computer readable media is provided, storing a set of instructions executable on at least one programmable device. The set of instructions cause the at least one programmable device to obtain, during execution of a process associated with a particular privilege level, data content from a memory location, and determine by a hardware-based detection circuit whether the data content matches at least one of one or more token values, with the one or more token values stored in one or more pre-determined memory locations, and with access of any of the pre-determined one or more memory locations indicating a potential anomalous condition. The set of instructions further cause the at least one programmable device to trigger, in response to a determination that the data content matches the at least one of the one or more token values, another process with a higher or same privilege level as the particular privilege level associated with the process, to handle occurrence of a potential system violation condition.

Embodiments of the computer readable media include at least some of the features described in the present disclosure, including at least some of the features described above in relation to the method and to the computing system.

Other features and advantages of the invention are apparent from the following description, and from the claims.

BRIEF DESCRIPTION OF THE DRAWINGS

These and other aspects will now be described in detail with reference to the following drawings.

Like reference symbols in the various drawings indicate like elements.

DESCRIPTION

Described herein are systems, devices, apparatus, circuits, methods, computer program products, media, and other implementations to implement a Random Embedded Secret Tokens (REST) approach that uses a hardware primitive for content-based checks, and realizes a framework based on the primitive to allow programs to blacklist memory regions at a low overhead. This primitive allows the program to store a long unique value, a token, in the memory locations to be blacklisted and to issue a privileged REST exception if it is ever touched with a regular access. Some of the implementations described herein realize a low overhead, low complexity microarchitecture for detecting these tokens. For example, when an L1 data cache line is filled, that memory line is checked for the REST token value and if there is a match, the cache line is marked as such. If a memory instruction accesses that marked line, an exception is invoked. The hardware modifications are relatively trivial, requiring no modifications to either the core design, or the coherence and consistency implementations of the cache, even for multicore, out-of-order processors. Some of the implementations described herein rely on content-based checks in which the metadata is stored alongside program data and requires no modification of the program's overall memory layout. Token checks may be performed directly (optionally on all data accessed by the program) and requires no behind-the-scene metadata processing.

To illustrate some of the approaches and techniques described herein, consider the following listing ("Listing 1") for a simplified version of CVE-2014-0160, a bug commonly known as the Heartbleed vulnerability reported in OpenSSL 1.0.1, as shown in the code provided in Listing 1.

Listing 1: Heartbleed out-of-bounds memory read bug.

```
1   int tls1_process_heartbeat(SSL *s) {
2       unsigned char *p = &s->s3->rrec.data[0];
3       unsigned short hbtype = *p++;
4       unsigned int payload;
5
6       /* Attacker-controlled memcpy length */
7       n2s(p, payload);
8
9       if (hbtype == TLS1_HB_REQUEST) {
10          unsigned char *buffer =
11              OPENSSL_malloc(payload);
12
13          /* Vulnerable OOB memory read */
14          memcpy(buffer, p, payload);
15          ...
```

Figure 1:
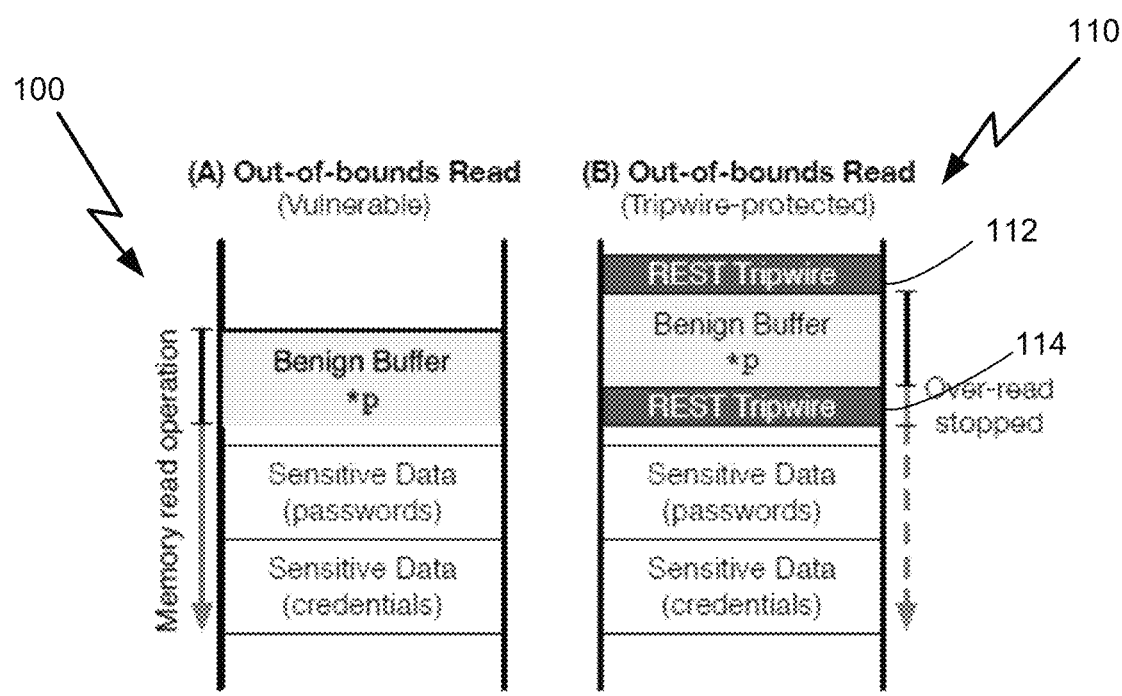
FIG. 1 are schematic diagrams of a portion of buffer storing sensitive diagram, with one of the buffer portions protected using an implementation based on random embedded secret tokens (REST).

Line 7 in the listed routine of Listing 1 contains an overflow bug in which the payload length, payload, is used to determine the size of data to be copied into the response packet without checking its validity. The resulting exploit can then be used to leak sensitive information such as passwords, usernames, secret keys etc., to the client. Furthermore, common protections involving (stack or heap) canaries would be unable to detect this attack, since it involves a read overflow and does not otherwise corrupt any program state. To prevent or inhibit this, REST tokens used in some of the implementations described herein are placed around the source buffer to be copied, so that when access goes beyond its bounds, a security exception is triggered, as shown in FIG. 1, providing schematic diagram of a portion of buffer storing sensitive diagram. The diagram 100 (marked as diagram "(A)") includes a portion of the buffer in which an unsanitized memcpy bug reads sensitive data outside the benign buffer. In contrast, in the diagram 110 (marked as diagram "(B)"), tripwire protection is added to the same buffer portion. Particularly, REST tokens 112 and 114 are placed around the buffer to detect out-of-bounds access.

Since REST implementations aim to detect and flag accesses to tokens, one challenge is to hide latencies associated with additional memory checks, while maintaining existing microarchitectural optimizations and ensuring the integrity of token semantics. Modifications of hardware for REST-based solutions include, in some embodiments, extending the instruction set architecture (ISA) with two new instructions and an exception type, as well as microarchitectural modifications to support them with minimal overhead. In an example modification of the ISA, the width of the token is that of a cache line (64B in an example system, although other cache line widths may be used), and its value is held in a token configuration register (which is not directly accessible to user-level applications).

Two example instructions may be added to set (store) and unset (remove) tokens in the application. The first new example instruction is the 'arm <reg>' instruction. This instruction stores a token (which can be of any value) at location specified in register reg, which should be capable of addressing the entire address space. The implicit operand in this instruction is the token value stored in a token configuration register. The specified location would generally have to be aligned to the token width, otherwise a precise invalid REST instruction exception would be generated. A second new instruction to support the REST solutions described herein is the 'disarm <reg>' instruction. This instruction is configured to overwrite a token at location specified in the register <reg>, which should be capable of addressing the entire address space, with the value zero ('0'), or some other pre-determined value (indicating that the cache line is not operating as a tripwire). Here too, the specified location would generally have to be aligned to the token width, otherwise a precise invalid REST instruction exception would be generated. Additionally, in a situation where there is no token at the location, a REST exception would be generated as well.

When a REST exception is triggered, the exception may be handled by the next higher privilege level (in some embodiments, exception handling may be performed by a process with the same privilege level). If the exception is generated at the highest privilege mode, the exception is considered to be fatal exception. In some embodiments, the faulting address is passed in an existing register. Setting the token value is done through a store instruction that writes to a memory-mapped address. Depending on the token width, one or more stores might be necessary to set the full token value. This operation may only be performed by a higher privileged mode.

Furthermore, two modes of operations, debug and secure, are provided. The secure mode is expected to be the typical mode of operation for programs in deployment and does not guarantee precise recovery of program state upon a REST exception (behavior for other exceptions for a given system would generally remain unchanged). In the debug mode, the entire program state at the time of REST exception can be precisely recovered by the exception handler. Thus, this mode is intended for use by developers. The current mode of operation can be configured by setting a bit in a token configuration register. It is to be noted that, in some embodiments, if the system is running in debug mode, the triggered process may be of the same privilege level (rather than a higher privilege level) as the current process that caused the exception.

Figure 2:
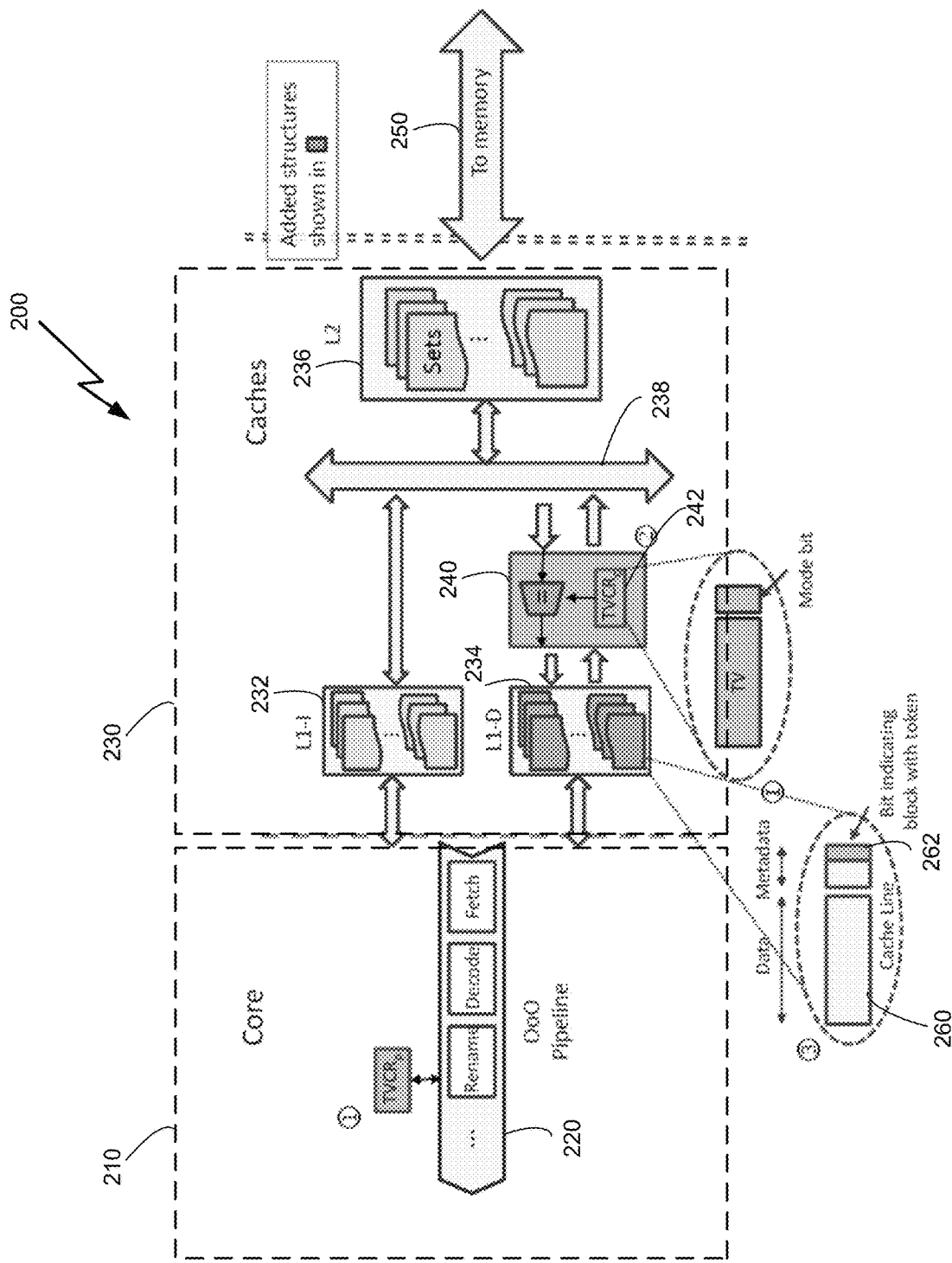
FIG. 2 is a diagram of an example modified cache architecture to support implementations of REST solutions.

With reference to FIG. 2, a diagram of an example modified cache architecture 200 to support implementation of the REST approaches described herein is provided. In some of the embodiments described herein, load and store operations check the accessed data against the token value and raise an exception in case of a match. Thus, logically each load becomes a load followed by a comparison of the loaded value with the token, while a store becomes a load of the value to be overwritten, a comparison with the token value, followed by the store. Additionally, reading and/or writing a 64B token value would involve data transfers over multiple cycles, since data buses are narrower. Naively implemented, this could increase the latency and energy of memory operations significantly. To minimize changes to the load store pipelines and latency for memory operations, checks required for the REST system may be performed when the cache lines are installed or accessed instead of when explicitly fetching the values and checking them.

The modified cache architecture may be implemented to include a core section 210 that includes a processing pipeline 220 for staged processing of instructions. Electrically coupled to the processing pipeline 220 is a multi-level cache 230, which in the example of FIG. 2 includes two levels, namely, L1, which is partitioned into an instruction portion L1-I cache 232 to store instruction code, and a data portion L1-D cache 234 to store non-instruction data. The multi-level cache 230 depicted in FIG. 1 further includes a second level L2 cache 236 which, in some embodiments, is configured to store both instruction and non-instruction data. Although the modified cache architecture is depicted as including a 2-level cache, in some implementations, the cache architecture 200 may include additional levels (alternatively, in some examples, the cache may include just a single cache level). A bus 250 couples the cache memory to non-cache memory (e.g., volatile memory, such as DRAM, and non-volatile memory such as solid-state memory, neither of which are shown in FIG. 2) while a cache bus 238 may be used to couple the L1 cache to the L2 cache.

As illustrated in FIG. 2, for the modified cache architecture 200, each cache line in the L1 data cache 234 may be extended to include one additional bit (or optionally multiple bits) to indicate if that line contains a token. For example, a cache line 260 may be extended to include a token indicator bit 262 (which may be part of a metadata portion of the cache line 260) that is used to flag (e.g., when set to a value of a logical '1') that the cache line 260 as containing a REST token. When a cache line is being installed, the value of that line is compared, by a detection circuit 240 (also referred to as a token detector) to the content of a token value register(s) 242, and in case of a match, the token bit corresponding to that line is set. The token value register may comprise several registers that each stores one of a plurality of possible token value that may be used. For example, different token values may be used to make the system less vulnerable to attacks, or to distinguish between different processes. The register(s) may also include mode bit(s) to indicate the mode in which the system is running (e.g., debug mode vs. secure mode). In some embodiments, more than one token value may be used. For example, allocation of token values may be per process, per controller, per thread, or at any other granularity level, and more than one token value may be allocated for every such process/controller/thread/etc. Since cache fills typically happen over multiple cycles, the token comparison can be decomposed into small manageable compare operation (say a 32b compare per cache fill stage) to reduce energy consumption. After the fill, memory operations that access lines for which the token bit set are flagged to throw a REST exception.

Figure 3:
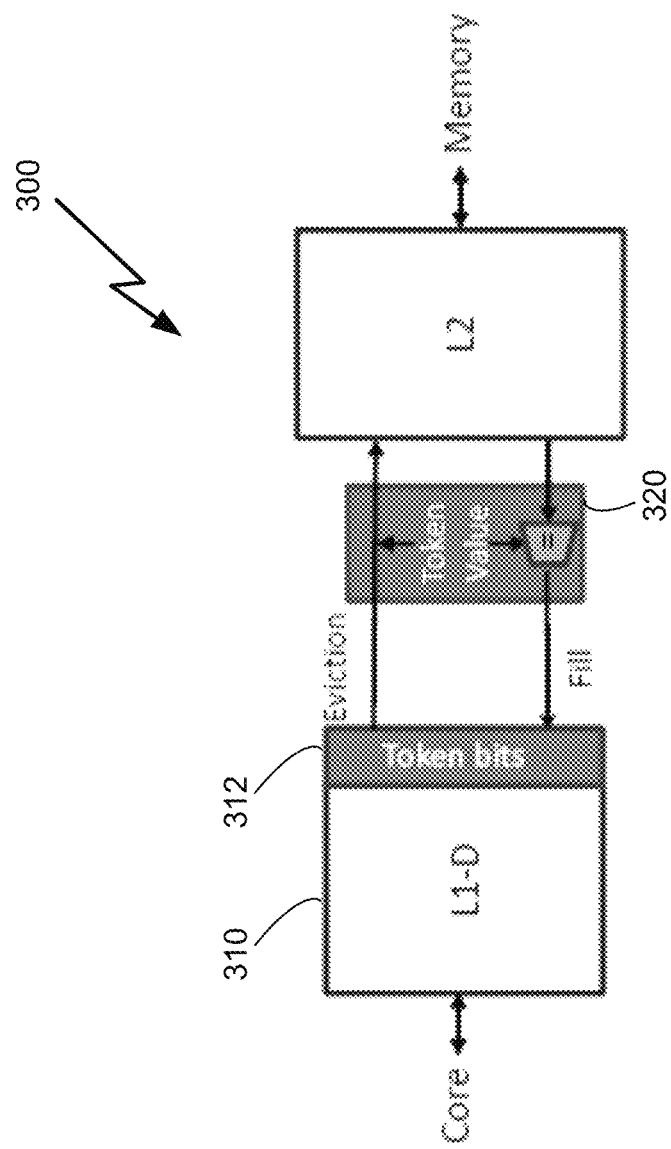
FIG. 3 is another diagram schematically illustrating an example hardware implementation to support the REST approach.

FIG. 3 is another diagram 300 to illustrate schematically example hardware implementing the REST approach. As shown, the hardware implementation includes an extra metadata bit 312 per cache line in L1 data cache 310, with that bit indicating whether a respective cache line contains a token. A token detector 320 (which may be implemented similarly to the detection circuit 240 of FIG. 2) examines incoming data from lower cache memory (or non-cache memory) and fills the token value into evicted (empty) cache lines. The extra bit 312 added to each cache line may be set to '1' (i.e., logical High) if the incoming data matches one of possible token values used by the system (with such token values stored, in some embodiments, in one or more registers). The token detector is a hardware-based circuit that is typically located within a cache memory (e.g., at the interface between the L1 cache memory and lower level memory devices), or can otherwise access the cache memory.

A disarm instruction (such as the one described above) unsets the token bit corresponding to the accessed line and may concurrently zero out the entire cache line. Since such an operation involves all data banks of the cache, disarm writes incur an additional (typically one cycle) latency. Additionally, disarms raise a REST exception if the token bit is not set on the destination line, thus ensuring that the program can only disarm armed locations. The arm instruction sets the token bit of the accessed line, but does not write the token value into it; the token values are written out when the line is evicted from the L1 data cache. This construction ensures that arm operations that hit in the cache complete in a single cycle, despite being a wide write. This implementation works naturally for write-allocate caches, which is one of the most commonly used allocation policies supported in current microarchitectures.

Turning back to FIG. 2, as noted, the modified cache architecture 200 includes the token detector 240 (also marked as unit 2), generally positioned at the interface between L1-D cache memory device and L2 cache memory device, to examine incoming data from memory (the detector can also be positioned at the boundary between the cache memory and non-cache memory, or elsewhere within the system). The circuitry of the modified cache architecture 200 also includes an extra metadata bit for all cache lines to indicate whether the associated cache line contains a token. It is to be noted that because detection of token values may be performed at various locations of the computing system (e.g., at the interface between L1 data cache and another cache level, at the interface between the cache and non-cache memory, etc.), the hardware requirements for different realizations (e.g., for different location of the detection circuit within the architecture 200) may vary depending and where the detection circuit is implemented.

Thus, some embodiments, such as the system embodiments of FIGS. 2 and 3 (i.e., of a modified cache architecture supporting the REST approach), include a system comprising one or more memory devices (e.g., cache memory, non-cache volatile memory such as DRAM), and a controller (e.g., a microprocessor or a non-programmable circuit) configured to obtain, during execution of a process associated with a particular privilege level, data content from a memory location at the one or more memory devices. The system further includes a hardware-based detection circuit (such as the detection circuit 240 of FIG. 2, or the detection circuit 320 of FIG. 3) configured to determine whether the data content obtained from the memory location matches at least one of one or more token values, with the one or more token values having been stored in one or more pre-determined memory locations at the one or more memory devices, and with access of any of the pre-determined one or more memory locations indicating a potential anomalous condition (e.g., token values may have been written into memory locations of the non-cache memory, to act as tripwires that cause exceptions in the event of a possible unauthorized access of the memory). In some examples, the hardware-based detection circuit may be configured to compare the data content to the one or more token values stored in one or more hardware registers accessible by the hardware-based detection circuit.

The controller is further configured to trigger, in response to a determination that the data content matches the at least one of the one or more token values, another process with a higher (typically when the system is running in secure mode during normal operation) or same (typically when the system is operating in debug mode) privilege level as the particular privilege level associated with the process, to handle occurrence of a potential system violation condition. In some variations, the other process may, if the exception is the first such instance resulting from the data of the particular memory location, regenerate a new token value, and cause that value to be placed in the particular memory location. Subsequently, if an exception again occurs due to the content of the same memory location (i.e., that memory location has again been accessed, and its content was determined to match the new token value), this may be indicative of an unauthorized attempt to access data, and the system may determine that more drastic protection/mitigation measures need to be taken.

As noted, the determination of whether the data content matches one of possible token values used may be based on a determination of whether a cache line bit (for the cache line into which the data content retrieved from a lower level memory device, such as a lower level cache memory or non-cache memory) is set to a value of '1' (or, in some embodiments, to a value of '0'). This determination may be performed by a processing pipeline of the controller (such as the pipeline 220 depicted in FIG. 2). In such embodiments, the controller may be further configured to generate a memory exception condition in response to determining that the token indicator of the at least one cache memory location (or a part of the at least one cache memory location) storing the data content is set to the particular indicator value indicating that that cache memory lines stores the token value. As also noted, in some embodiments, the detection circuit is located at an interface between an L1 data cache memory and another memory device, with the other memory device comprising one of, an L2 cache memory, or non-cache memory. To store token values into particular memory locations (e.g., to set up tripwires), the controller may be further configured to execute arm instructions to write at least some of the one or more token values into the pre-determined more or more memory locations. The controller may also be configured to randomly determine at least some of the pre-determined one or more memory locations into which to write at least some of the one or more token values. The token values may, in some examples, include random-ized-generated values stored in one or more registers accessible by the detection circuit (e.g., via one or more registers to hold such randomized generated token values).

Because arm and disarm instructions write values, they are functionally stores instructions, and handled as such in the microarchitecture with one key difference. Unlike stores, the arm and disarm instructions should not forward their values to younger loads, as this will violate the invariant that the REST token must be a secret. One simple way to provide this invariant is to serialize the execution of arm and disarm execution, i.e., ensure that an arm or disarm instruction is the only inflight instruction when it is encountered in the decode stage. In such embodiments, the controller of the system may further be configured to serialize performance of arm and disarm instructions controlling the placement of the one or more token values in the one or more pre-determined memory locations (at the one or more memory devices) such that a particular arm or disarm instruction cannot begin execution until all preceding instructions have been completed, and no new instruction can begin execution until performance of the particular arm or disarm instruction has been completed.

Figure 4:
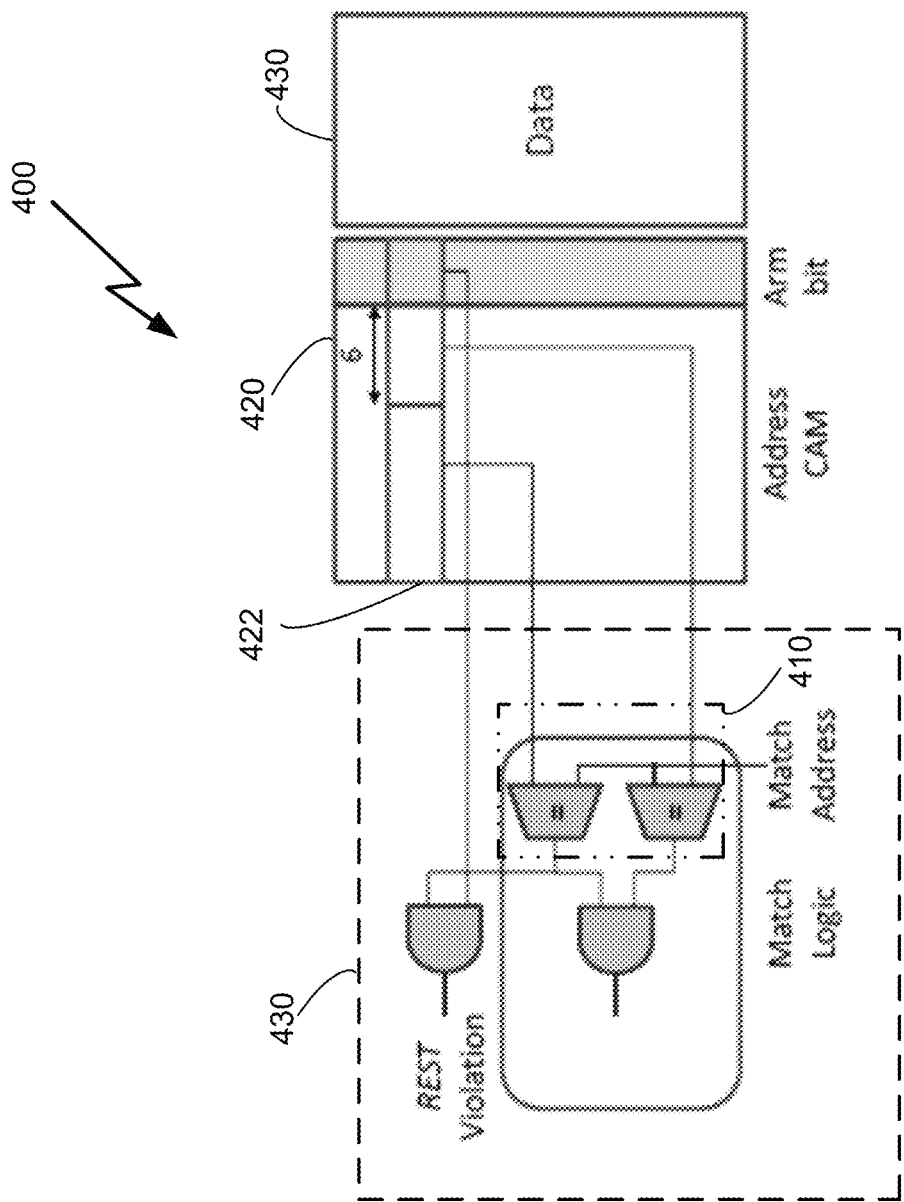
FIG. 4 is a diagram of example circuitry illustrating a modified load-store-queue (LSQ) mechanism to support a REST-based implementation.

Instead of serialization, another implementation, based on a modified load-store queue (LSQ) mechanism to prevent/inhibit such forwarding in a common (and complex) structure, may be used to support store to load forwarding. With reference to FIG. 4 (providing a diagram of an example circuit 400, depicted schematically, to implement a modified LSQ mechanism), consider a scenario where an arm request is closely followed by a read to the same cache line. The example circuitry 400 includes match address logic 410 to match a requested address with the an address associated with a cache line 422 (which may be split into multiple address segments) from the Address content addressable memory (CAM) 420, that holds the address associated with corresponding data content provided in a data memory buffer 422). In this scenario, the load may "hit" the in-flight arm in the LSQ, thus forwarding an otherwise illegal read. When this case is encountered, a privileged REST exception may be invoked. This exception support can be implemented without any additional state or impact on LSQ access timing. To do so, a REST violation check (via the example circuitry 430) is incorporated into existing matching logic by breaking the match down to perform two matches—one an address match for the cache line address, and another for the remaining data. Additionally since the arm and disarm write values are implicit and known by the cache, a value does not need to be included with the corresponding entry in the store queue. With these modifications, LSQ access latencies and data widths remain unchanged despite the introduction of very wide writes. Such address modifications may be necessary at other places in the microarchitecture where store-to-load forwarding may occur.

Thus, in some embodiments, a controller in a REST-based implementation may include a load-store queue (LSQ) circuit configured to trigger an exception condition upon determination that an arm instruction to one of the pre-determined one or more memory location is executed substantially at the same time as a read operation from the one of the pre-determined one or more memory locations. The handling of various conditions by the modified LSQ mechanism described herein is provided below in Table 1.

TABLE 1

Actions taken on various operations for L1-D cache hits and misses

| Action | LSQ | Cache Hit | Cache Miss |
|---|---|---|---|
| Arm | Create entry in SQ, tag as arm | Set token bit | Fetch line, set token bit. |

TABLE 1-continued

Actions taken on various operations for L1-D cache hits and misses

| Action | LSQ | Cache Hit | Cache Miss |
| --- | --- | --- | --- |
| Disarm | Raise exception if SQ has disarm for same location. Else insert entry with no store value in SQ, tag as disarm. | If token bit unset, raise exception. Else clear line, unset token bit(s). | Fetch line, set token bit if it has token. Proceed as hit. |
| Load | If value can be forwarded from armed SQ entry, raise exception. As usual otherwise. | If token bit set, raise exception. Else read data. | Fetch line, set token bit if it has token. Proceed as hit. |
| Store (Secure) | Raise exception if SQ has arm for same location. As usual otherwise. | If token bit set, raise exception. Else write data. | Fetch line, set token bit if it has token. Proceed as hit. |
| Store (Debug) | Raise exception if SQ has arm for same location. As usual otherwise. | If token bit set, raise exception. Else write data. | Fetch line, set token bit if it has token. Delay store commit till ack from L1-D. |
| Coherence Msgs. | N/A | As usual. | As usual. |
| Eviction | N/A | If token bit set, fill token value in outgoing packet. | N/A |

The performance of the REST-based implementation can be further optimized by being flexible about how and when exceptions are reported. Supporting precise exceptions with the REST-based implementations discussed herein requires disabling performance optimizations such as critical-word first, and early and eager commit of stores that are common in modern processors. However, REST exceptions do not have to be reported with maximum precision, especially when it is used for monitoring for security violations during deployment, since in these cases the user is typically interested in knowing if a security violation occurred or not, and not the state of the machine when the violation occurred. If the L1 data cache (e.g., the memory device 234 of FIG. 2) supports critical-word first fetching, the access request may be satisfied before the whole line has arrived and a match determined. This creates the possibility of a delay between load commit and the security check, especially when the load is at the head of the ROB (the processor re-order buffer) and is committed as soon as the critical word arrives but the entire line has not. In the debug mode, loads are not released from the MSHRs (miss information/status holding register), as long as the delivered word partially matches the token value. On a mismatch, the load is released without any performance penalty. In the secure mode, REST exception is reported independent of the load commit. Additionally, since stores are committed from the ROB as soon as the store/arm/disarm becomes the oldest instruction, REST violations due to a faulty access might not be resolved in time. By the time the violation is detected at the cache and the response is received at the ROB, the offending instruction may have retired. This will result in an imprecise REST exception. In the debug mode, precise exceptions can be achieved by delaying store commit until writes completion.

In some embodiments, the token width can be reduced for security and performance reasons. For instance, instead of a full cache line width, half or quarter cache line tokens may be used. Most of the modification to the cache architecture described above (e.g., to configure the architecture to support the REST-based solution) can be scaled to accommodate this. For instance, the token value register can be smaller, and the number of token bits per line can be increased to 2 and 4 for 32- and 16-byte tokens respectively.

The REST primitive described herein provides programs the capability to blacklist certain memory locations and disallow regular access to them. Programs can leverage the REST primitive to obtain spatial and temporal memory safety with little to no changes in its construction and/or layout. For example, in some embodiments, REST's software framework uses tokens to denote redzones. This obviates two major components various conventional tools (such as ASan, which is a popular open-source error detection tool) use. Because the hardware implementation supporting the REST approach continuously detects access to tokens without software intervention, monitoring every program read and write in software becomes unnecessary. Thus, memory operations no longer need to be instrumented for checking access validity. Secondly, since REST tokens do not require separate maintenance of metadata, the need for shadow memory is eliminated as well. Combined, this can eliminate two major sources of performance and memory overheads, simplifying the implementation complexity.

Figure 5A:
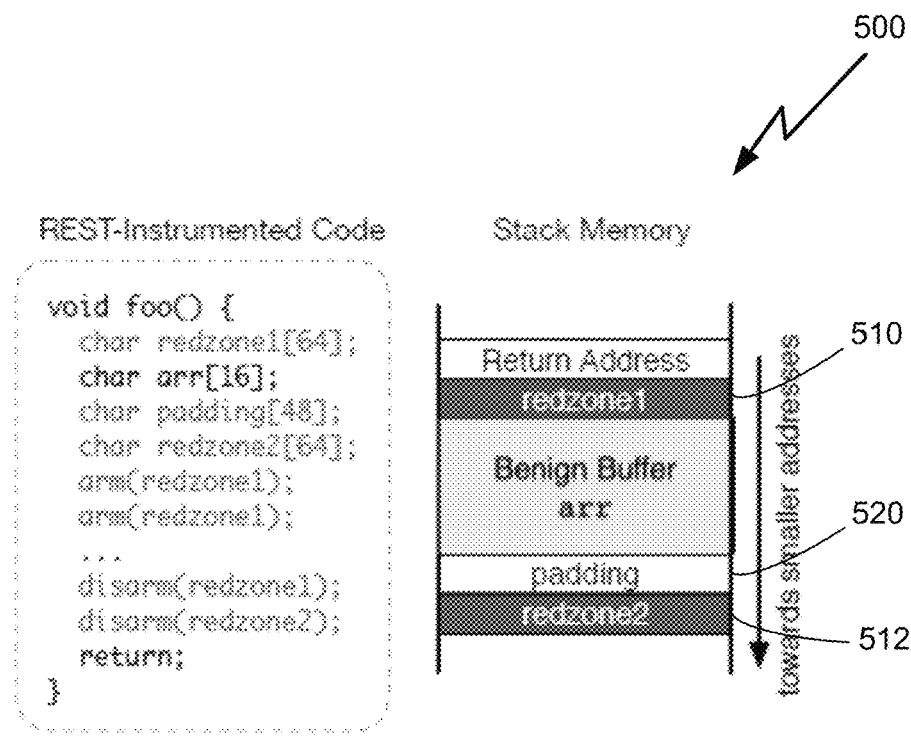
FIG. 5A is a diagram showing how a REST-based implementation protects vulnerable stack variables.

FIG. 5A is a diagram 500 showing how the REST implementation can protect vulnerable stack variables. As shown, in some examples, protecting vulnerable stack variables involves placing redzones, such as redzones 510 and 512, around such vulnerable buffers. This may be done by code added at the function prologue, so redzones isolate these variables from the other local variables. The size of each redzone may be chosen as a multiple of the token width and may be based on the size of the data structure. Subsequently, overflows during the frame's lifetime are detected when accesses go past their boundaries and into one of the redzones. Code is also inserted at the function epilogue to clean up the tokens so that future frames inherit a clean stack. Since the above changes involve modifying the stack layout, the REST-based implementations may require compiling binaries with a REST-compatible plugin. However, since stack attacks have become a less significant threat vector in recent years, users may also choose to forego stack protection, if performance is a concern, and just opt for heap protection as described below.

Figure 5B:
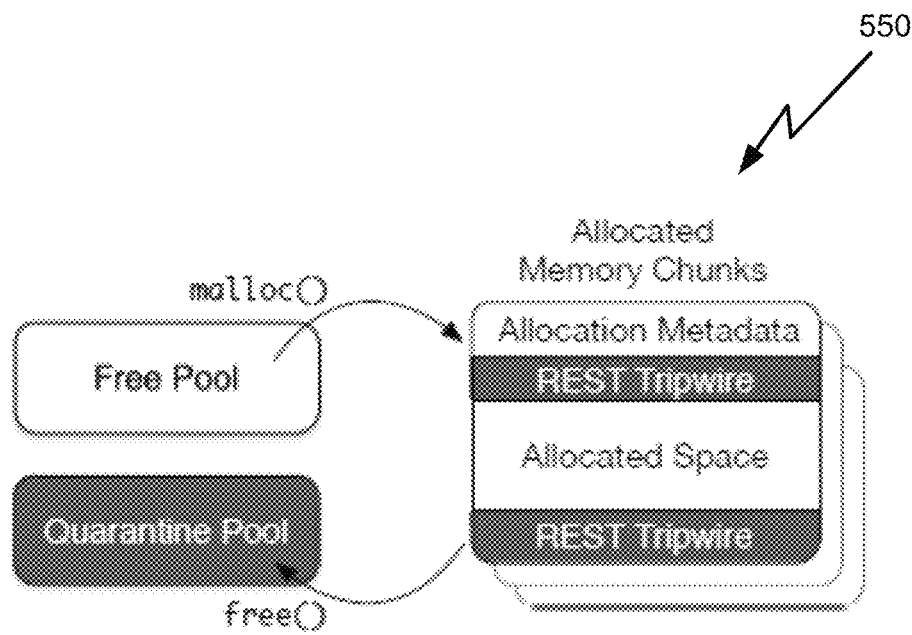
FIG. 5B is a diagram illustrating spatial heap protection by a REST-based implementation.

In some embodiments, some of the REST-based implementations described herein may be used to secure the heap with a custom allocator (which may be similar to one adapted from ASan). Spatial heap protection is provided by ensuring that the allocator surrounds every allocation with redzones, as illustrated in the diagram 550 of FIG. 5B. These redzones not only separate the allocations from each other but also from the metadata. Temporal bugs are prevented by filling all freed allocations with tokens and placing them in a separate quarantine pool, instead of the pool of free memory from which new allocations are assigned. They remain there until the free memory pool has been sufficiently consumed at which point, they are disarmed and released for reallocation. Thus, UAF attacks are mitigated since freed allocations remain blacklisted and attempts at accessing them via dangling pointers or double frees can be caught.

One modification that can be made the custom allocator adapted from the ASan is with respect to ASan's free pool management. ASan can be configured to require that all entries in its free and quarantine pool be blacklisted. This necessitates blacklisting newly mapped region from the system, and marking them valid just before allocation. For the REST-based implementations, this invariant can be relaxed to guarantee that only quarantined regions are blacklisted while those in the free pool are zeroed. This is because blacklisting, in our case, involves storing tokens all over the newly mapped regions and is hence slower than just rewriting corresponding metadata as is done by ASan. This invariant is maintained for reused regions since disarm operations zero out memory before they are moved to the free pool and reallocated, thus avoiding uninitialized data leaks. One advantage of the protection mechanism implemented for the REST-based approach is that it works with legacy binaries. Since REST-based implementations perform memory access checks in hardware, heap protection in this case does not require any instrumentation of the original program and can thus be availed even by legacy binaries, as long as the custom allocator is used (with LD_PRELOAD environment variable in Unix-based systems, for instance).

While multiple token values can be used (to arm various memory locations with these tripwire-like content), at the system level a single token value may be sufficient. Particularly, the token widths are sufficiently long that the chances of a random program value matching a token is vanishingly small. However, leaking this value via physical or side-channel attacks might still be possible and would compromise the entire system. Thus, periodically this token value can be rotated (at reboot, for instance). The implementations for heap safety allow this option without the need for recompilation. Alternatively, a unique token value could be used for every process with the OS maintaining them across context switches. With that design, some changes to the operating system (OS) may be required, such as the generation of token values and the ability to deal with tokens from different processes when processes are cloned or when they communicate with each other.

Further features and advantages of some of the implementations described herein are next discussed. For the purposes of this discussion, it is assumed that the target program has one or more memory vulnerabilities that can be exploited by an attacker operating at the same privilege level to gain arbitrary read and/or write capabilities within the execution context (no assumptions are made as to how these vulnerabilities arise or what attack vectors are used to exploit them). It is also assumed that the target has common hardware defenses available in conventional systems (e.g., NX-bit). Furthermore, it is assumed that the hardware is trusted and does not contain and/or is not subjected to bugs arising from improper usage parameters resulting in glitching, physical, or side-channel attacks.

Another assumption for the implementations described herein is that token detection does not suffer from false positives, which occur when token exceptions are triggered by a legitimate chunk of program data. Three conditions have to be met for this: 1) the data chunk equals token value, 2) it is aligned to token width, and 3) it is fetched into the L1 data cache, thus passing through the token detector. If data transiently acquires the token value while already in L1 data cache or any other part of the memory subsystem, no exception is raised. To avoid such false positives, it is therefore important not only to choose a properly random token value but also an appropriate token width. In an example implementation, a width of 512 bits may be used, which makes the chances for a program data chunk causing a false positive less than $$\frac{1}{2^{512}}.$$

If this degree of overprovisioning is considered excessive, smaller token widths of 256 bits or even 128 bits could be used. These values should entail minimal changes to the system implementations, and can even be supported simultaneously.

One feature of the REST-based implementations described herein is to ensure that once a token is set, it can only be removed through a disarm operation and cannot be otherwise overwritten (or even read) by any process at the current privilege level. Additionally, REST exceptions cannot be masked from the same privilege level. These measures ensure that adversaries cannot exploit inter-process, inter-core, or inter-cache interactions to bypass token semantics. As noted, in some embodiments, the detector (e.g., the detection circuits 240 or 320 of FIGS. 2 and 3, respectively) may be positioned at the L1 data cache in order to keep the other caches unmodified and hence, minimize design costs. Consequently, however, under these circumstances, the REST-based implementations might not be able to catch all token accesses via means that sidestep the cache (e.g., DMA).

Token width can affect token alignment and therefore affect the target data structures. Imposing this granularity on program data, in turn, introduces small gaps between variables. For instance, in FIG. 5A, the REST-based implementations add a pad space (such as a padding 520) adjacent to an array to conform to the granularity requirement (64B in the figure). This introduces the scope for false negatives, in which the REST-based implementations may not be able to detect overflows that are small enough to spill into the pad, but not into the token itself. This implies that although protection against read/write overflows can still be provided, the implementations are vulnerable to uninitialized data leaks in the stack, which can be simply prevented by zeroing out the padding or using narrower tokens. Uninitialized data leaks are not a problem in the heap, however, due to the invariant that all regions in our allocator's free pool are zeroed.

An implementation choice of mandating precise specification of an armed location while disarming was intended to counter a scenario when an attacker has somehow obtained control of a disarm gadget (i.e., can influence its address argument), but does not accurately know the layout regarding which memory locations are specifically armed. In such a scenario, this implementation decision prevents or inhibits attackers from blindly disarming swathes of memory regions. Properly compiled code, however, should have no problems due to this stipulation.

Another advantageous feature of the present implementations relates to the privilege levels at which programs operate. Although used in some security mechanisms, software-based tripwire mechanisms, such as ASan, are primarily developed for debugging. While such software-based systems can serve as a security tool under weak threat models and performance requirements, realistically it has limited utility as one. This is primarily because their frameworks are implemented at the same privilege level as the program itself. While the location of shadow memory is randomized, it remains open to memory disclosure attacks, upon which the metadata can be easily tampered with. Memory access monitoring, while statically baked into the program, can also be subverted with carefully crafted code gadgets or even simple code injection. These problems/vulnerabilities in the REST-based implementations can be mitigated by raising a REST violation on a token, regardless of privilege.

Because, in some situations, the REST-based implementations may not be configured to probe for the presence of a token, or keep a log of all armed locations, disarming operations need to be carried out in the presence of a known reference point. For the stack, frames serve this purpose, i.e., for a given function, arms/disarms occur at fixed offsets within the frame. Consequently, in such embodiments, the REST approach may not be able to support programs that use set jmp/long jmp since these instructions alter the stack layout. A conventional system such as ASan takes a conservative approach in such cases by zeroing out the metadata, and hence whitelisting the entire region of the current stack. In the REST-based implementations a similar strategy cannot be used because the active tokens on the stack are not being tracked.

In some embodiments, to avoid the possibility that attackers might exploit layout predictability (e.g., by jumping over redzones), the REST-based implementations may be realized with some variant of layout randomization (e.g., layout randomization for the heap and stack), depending on the usage scenario. Alternatively, programs could also sprinkle arbitrary tokens across the data region in a configurable manner to catch such attempts.

In terms of temporal safety, there may be some vulnerabilities since previously allocated blocks are unmarked when they reallocated, after which point, dangling pointers or double frees can no longer be detected. This weakness can be mitigated to some extent by using heuristics such as reducing reallocation predictability by maintaining some degree of randomness for new allocations and ensuring that its entropy is not compromised by maintaining a large enough free memory pool.

In a framework such as ASan, to be effective, memory accesses to user data need to be monitored. Hence, it is important that software modules (the main program and shared libraries) be compiled with ASan support. Consider a situation where the program itself has been compiled as desired but a third-party library has not. In such a case, if the library has faulty code resulting in buffer overflow and it operates on a ASan-augmented buffer, the scope for exploitation still remains since read/writes in the library are not being monitored. The reverse situation also applies when the fortified code is in the ASan-augmented program but the data originates in the library, since the foreign buffer does not have the right bookends. ASan requires both access monitoring and metadata maintenance, one or both of which might break when using non-ASan augmented modules. Analyzing and instrumenting the shared libraries at runtime would incur a huge performance penalty. The REST-based implementations described herein relax this requirement by not requiring explicit access monitoring. Thus, as long as the data itself is properly bookended, it does not matter whether the code accessing it has been instrumented or not. As such, it is more compatible with untreated external libraries. Since token access also generates exceptions at higher privileged levels, token manipulation via syscalls is also prevented.

Figure 6:
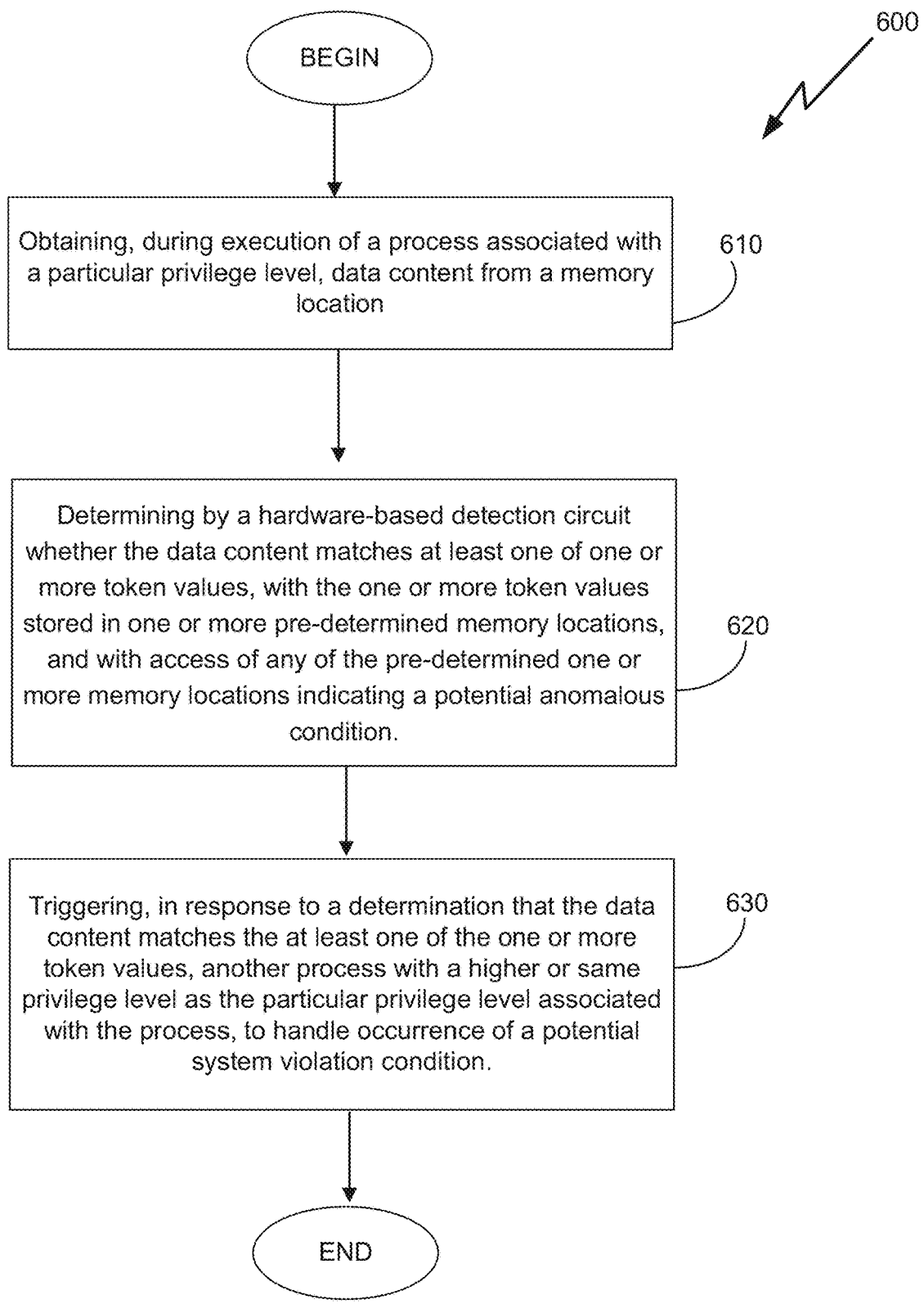
FIG. 6 is a flowchart of an example procedure to detect and mitigate anomalous computing conditions using a REST-based framework.

With reference next to FIG. 6, a flowchart of an example procedure 600 to detect and mitigate anomalous computing conditions (e.g., malicious computer attacks) based on the REST framework described herein is shown. The procedure 600 includes obtaining 610, during execution of a process associated with a particular privilege level, data content from a memory location. The obtaining operation may be a read or data retrieval operation from a low level cache memory device, or a non-cache memory device (volatile or non-volatile memory storage device).

Having obtained the data content, the procedure 600 further includes determining 620 by a hardware-based detection circuit (such as the detection circuits 240 or 320 of FIGS. 2 and 3, respectively) whether the data content matches at least one of one or more token values, with the one or more token values stored in one or more pre-determined memory locations, and with access of any of the pre-determined one or more memory locations indicating a potential anomalous condition (e.g., an unauthorized data breach). In some examples, the one or more token values may include randomized-generated values. In some embodiments, the at least one of one or more token values may be a value represented by a multiplier (e.g., an integer, a fraction, a rational number, and so on) of a number of bits in a cache memory location of a cache memory executing the particular process and the other process. In some embodiments, determining whether the data content matches the at least one of one or more token values may include comparing, by the hardware-based detection circuit, the data content to the one or more token values stored in one or more hardware registers accessible by the hardware-based detection circuit. Determining whether the data content matches the at least one of one or more token values may include comparing portions of the data content to respective portions the at least one of the one or more token values over multiple clock cycles. In some examples, the hardware-based detection circuit may be located at an interface between an L1 data cache memory and another memory device (e.g., an L2 cache memory, or non-cache memory). In some examples, at least one of the pre-determined one or more memory locations is outside a boundary of a process-accessible data structure, e.g., the memory location populated/armed with a token value may be adjacent to the process-accessible data structure, in close proximity (although not adjacent) to the boundary of the process-accessible data structure, or anywhere else in the memory space.

With continued reference to FIG. 6, the procedure 600 additionally includes triggering 630, in response to a determination that the data content matches the at least one of the one or more token values, another process with a higher or same privilege level as the particular privilege level associated with the process, to handle occurrence of a potential system violation condition. In some embodiments, triggering the other process may include communicating to the other process information about access of the memory location, including one or more of, for example, a program counter value, timing information for the access of the memory location, and/or other information. In some examples, determining whether the data content matches at least one of one or more token values may include setting, in response to a determination of a match of the data content to the at least one of the one or more token values, a token indicator of at least one cache memory location, or a part thereof, storing the obtained data content to an indicator value indicating the at least one cache memory location, or part thereof, stores a token value. In such embodiments, triggering the other process may include generating a memory exception condition in response to determining that the token indicator of the at least one cache memory location storing the data content is set to the indicator value indicating the at least one cache memory location stores the token value. The token indicator of the at least one cache memory location may include a token bit.

In some embodiments, the procedure 600 may further include executing arm instructions to write at least some of the one or more token values into the pre-determined one or more memory locations. In some variations, the procedure 600 may also include randomly determining at least some of the pre-determined one or more memory locations into which to write at least some of the one or more token values. The procedure 600 may also include regenerating, by the triggered other process, a new token value, and replacing content of the memory location that included the at least one of the one or more token values with the regenerated new token value. Thus, for example, upon the triggering of the other process (because the data content from the memory location was determined to match one of the pre-determined token value placed in various memory locations), that other process (handling exceptions) may initially generate a new token value that is used to replace the content of the memory location that included the tripwire token value that triggered the process. If, subsequently, the other process is again triggered because the memory location including the new token value was accessed, this may be an indication of an unauthorized access of the system, and consequently the other process may, at that point, cause more drastic measures to be taken.

Performing the various operations described herein may be facilitated by a controller system (e.g., a processor-based controller system). Particularly, at least some of the various devices, systems, and/or circuits described herein, including the circuitry to arm memory locations with token values, set token bits on cache lines determined to contain data content corresponding to token values, trigger exception conditions, invoke higher privilege processes, etc., may be implemented, at least in part, using one or more processor-based devices.

Figure 7:
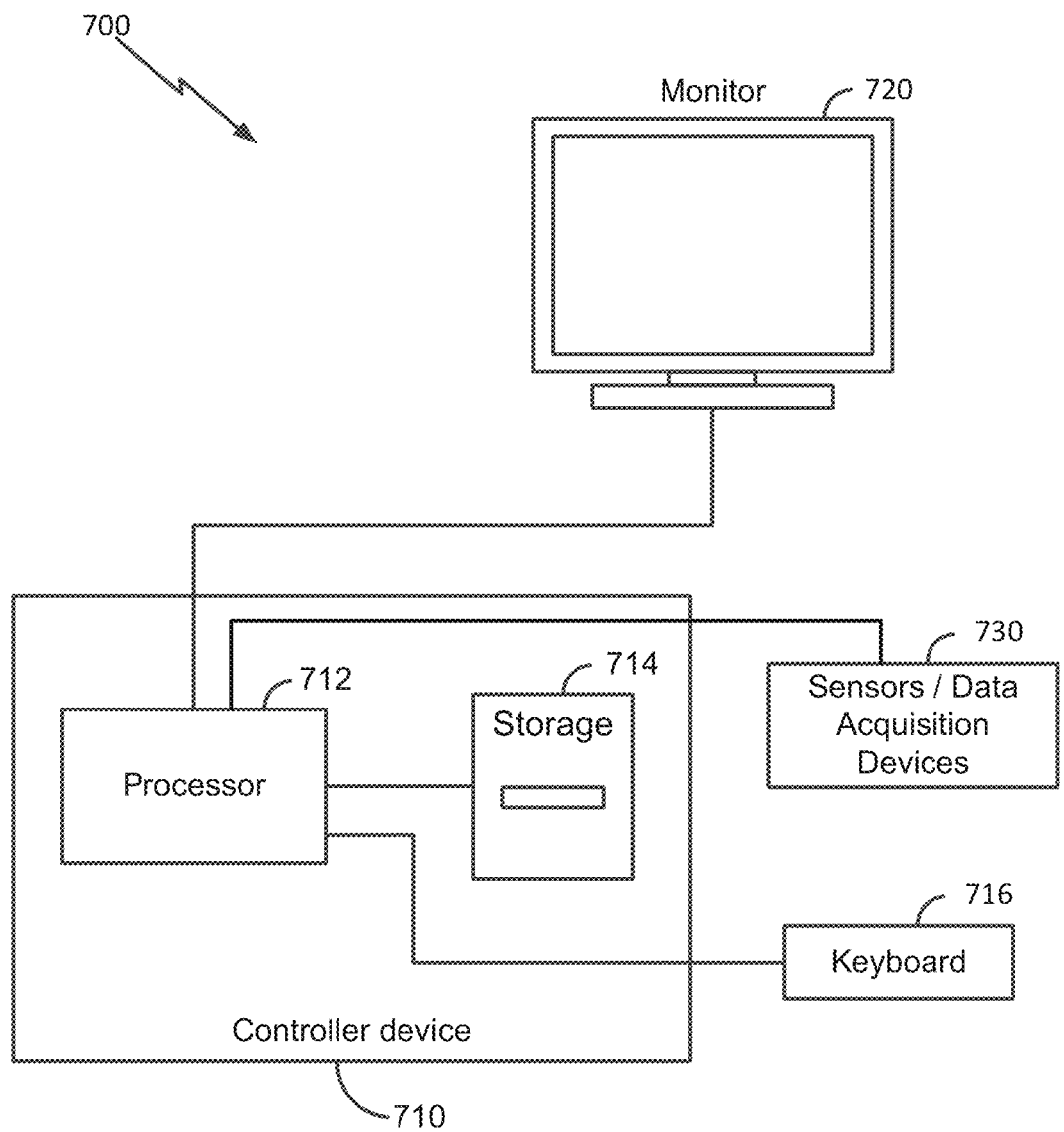
FIG. 7 is a schematic diagram of a computing system.

Thus, with reference to FIG. 7, a schematic diagram of a computing system 700 is shown. The computing system 700 includes a processor-based device (also referred to as a controller device) 710 such as a personal computer, a specialized computing device, a mobile device (e.g., a smartphone) and so forth, that typically includes a central processor unit 712, or some other type of controller. In addition to the CPU 712, the system includes main memory, cache memory and bus interface circuits (not shown in FIG. 7). At least some elements of the CPU 712 may be configured to allow the implementation of the REST-based procedures and solutions described herein. For example, cache lines may be extended to include token bits to indicate when the data content placed into respective cache lines corresponds to token values, a token detection circuit may be added to the CPU (e.g., at the interface between the L1 and L2 cache memory devices), the processing pipeline may be modified to support the REST-based solutions described herein, etc.

The processor-based device 710 may include a mass storage element 714, such as a hard drive (realize as magnetic discs, solid state (semiconductor) memory devices, and so on), flash drive associated with the computer system, etc. The computing system 700 may further include a keyboard 716, or keypad, or some other user input interface, and a monitor 720, e.g., an LCD (liquid crystal display) monitor, that may be placed where a user can access them. The computing system 700 may also include one or more sensors or data acquisition devices 730 such as, for example, an image-capture device (e.g., a digital camera), a wireless or wired transceiver to receive data and control transmissions from remote devices, inertial sensors, etc.

The processor-based device 710 is configured to facilitate, for example, protection against data breaches and against other types of anomalous conditions. The storage device 714 may thus include a computer program product that when executed on the processor-based device 710 causes the processor-based device to perform operations to facilitate the implementation of procedures and operations described herein. The processor-based device may further include peripheral devices to allow input/output functionality. Such peripheral devices may include, for example, a CD-ROM drive and/or flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively or additionally, in some embodiments, special purpose logic circuitry, e.g., an FPGA (field programmable gate array), an ASIC (application-specific integrated circuit), a DSP processor, a GPU, etc., may be used in the implementation of the system 700. Other modules that may be included with the processor-based device 710 are speakers, a sound card, a pointing device, e.g., a mouse or a trackball, by which the user can provide input to the computing system 700. The processor-based device 710 may include an operating system, e.g., Windows XP® Microsoft Corporation operating system, Ubuntu operating system, etc.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. Non-transitory computer readable media can include media such as magnetic media (such as hard disks, floppy disks, etc.), optical media (such as compact discs, digital video discs, Blu-ray discs, etc.), semiconductor media (such as flash memory), electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, and circuits, and/or any suitable intangible media.

To test and evaluate the performance of some of the implementations described herein, several studies, simulations, and experiments were conducted. A REST-based framework was implemented using an out-of-order CPU model of gem5 for the x86 architecture. Due to its limited support for large memory mappings, it was not possible to run x86/64 binaries. Consequently, 32-bit i386 binaries of the SPEC CPU2006 C/C++ benchmark were simulated on the modified simulator in the syscall emulation mode with a configuration shown in Table 2.

TABLE 2

Simulation base hardware configuration

| | Frequency | Frequency |
|---|---|---|
| CORE | BPred | L-TAGE, 1 + 12 components, 31k entries total |
| | Fetch | 8 wide, 64-entry IQ |
| | Issue | 8 wide, 192-entry ROB |
| | Writeback | 8 wide, 32-entry LQ, 32-entry SQ |
| MEMORY | L1-I | 64 kB, 8-way, 2 cycles, 64 B blocks, LRU replacement, 4 20-entry MSHRs, no prefetch |
| | L1-D | 64 kB, 8-way, 2 cycles, 64 B blocks, LRU replacement, 8-entry write buffer, 4 20-entry, MSHRs, no prefetch |
| | L2 | 2 MB, 16-way, 20 cycles, 64 B blocks, LRU replacement, 8-entry write buffer, 20 12-entry MSHRs, no prefetch |
| | Memory | DDR3, 800 MHz, 8 GB, 13.75 ns CAS latency and row precharge, 35 ns RAS latency |

The arm and disarm instructions were implemented by appropriating the encodings for x86's xsave and xrstor instructions respectively, which are themselves unimplemented in gem5. The benchmarks were compiled with Clang version 5.0.0 with "–O3-mno-omit-leaf-frame-pointer-mno-sse-fno-optimize-sibling-calls-fno-omit-frame-pointer" flags. These programs were run to completion with the test input set. Since executions with these inputs spend a significant amount of time initializing (and allocating) compared to the ref input set, this choice of input sets should reflect on results adversely since the overheads associated with the allocator used will not be amortized with computation as well as in the case of ref inputs.

Figure 8:
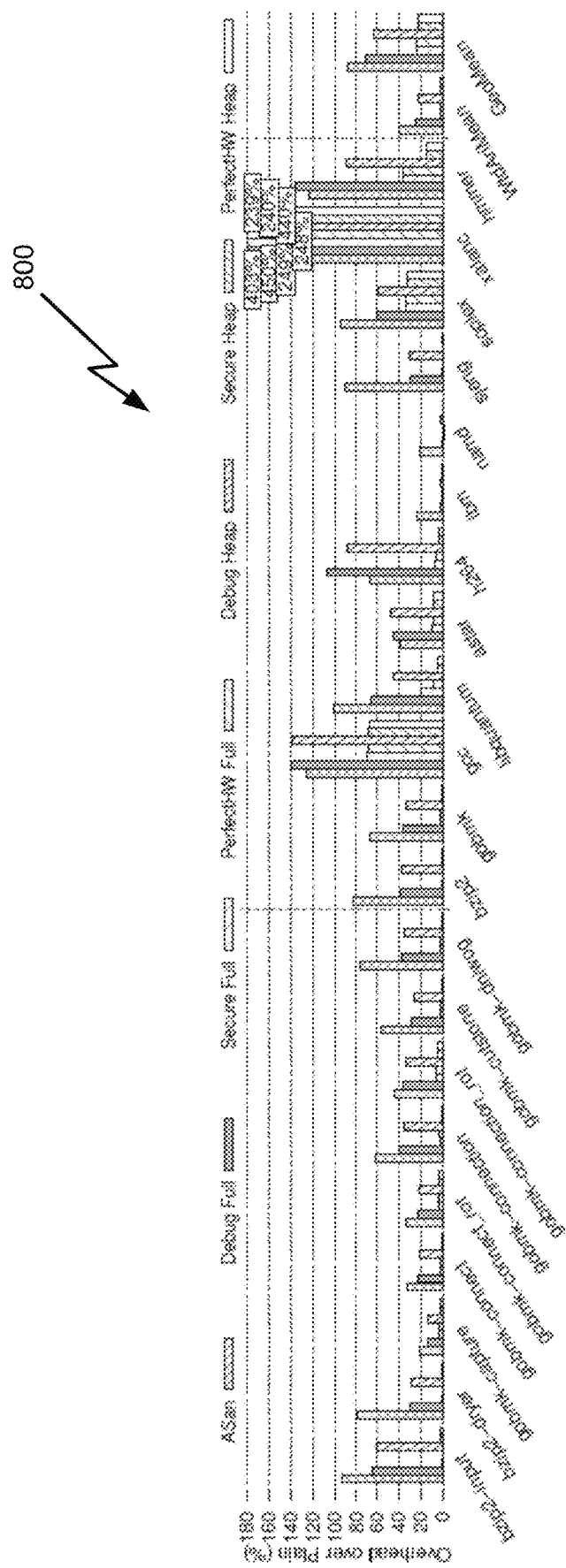
FIG. 8 includes a graph showing runtime overheads for different implementations of the REST approach.

To evaluate the REST framework, the framework was compared against two baselines-unsafe, plain binaries using the stock libc allocator, and binaries fortified with ASan. Two modes were evaluated, namely, secure with imprecise exception, and debug with precise exceptions, for two defensive scopes, full (i.e., stack and heap) and heap only. Additionally, another category of numbers was presented for perfect, zero overhead REST hardware (referred as PerfectHw) as a limit study of the current hardware design's optimality. The results are presented for each benchmark in FIG. 8 (providing a graph 800 showing the runtime overheads for ASan and for a REST-based implementation in different modes) as slowdowns relative to the unsafe binary.

In addition, the weighted average mean overhead is also shown (referred as the WtdAriMean). For reference, the geometric mean of the overheads is also presented in the figure, but for the following discussion, the cited values refer to the weighted average, not geometric mean.

In the secure mode, REST shows an overhead of 2% while providing full or heap safety respectively. For the debug mode, the corresponding values are 25% and 23% respectively. Relative to ASan, the REST-based implementation do not perform memory checks (via explicit program instrumentation or libc call interception). In case of just heap safety, it additionally does not bear the cost of stack instrumentation. Accordingly, it is observed that the numbers for REST's full safety follow the expected trend. gcc and xalanc exhibit especially high overheads since they use the allocator more frequently than others, which provided the breakdown of various components of REST's slowdown. Particularly in the case of xalanc, which makes a high frequency of allocations (0.2 allocations per kilo-instructions), the allocator overheads dominate significantly compared to other benchmarks. Benchmarks that use the allocator more sparingly (lbm and sjeng, for instance, which make less than 10 allocation calls overall) have little to negligible overheads.

These results additionally indicate that an allocator (which in the test implementation was based on an ASan-type allocator), is a major contributor to REST's overhead. This is evidenced by the fact that the full and heap safe categories exhibit almost equal overheads, differing only by 0.16% on average. Thus, if recompilation is an option for users, REST-based implementations could provide stack safety at nominal extra cost. In the tested implementation, the ASan allocator was used for convenience. However, future implementations could potentially mitigate some of the observed overheads.

The difference in runtimes for the secure and debug modes arises, in part, due to the fact that, in the debug mode, store commits are delayed until the corresponding write completes. In the simulated out-of-order core, although the impacts of this change manifests in many ways, a few side-effects were predominantly observed. First, unsurprisingly, it was shown that the number of cycles the ROB was blocked by a store was about an order of magnitude higher in the debug mode. IQ (instruction queue) occupancy was also severely affected for the latter case, especially for xalanc that had the number of cycles IQ was full in the secure and debug modes differed by more than 100×. Notably, there was not a lot of traffic observed at the main memory interface due to token fills, indicating that most token accesses hit in the cache and do not otherwise contribute to memory access bandwidth for any of the benchmarks in either mode (only 0.04 tokens per kilo-instructions crossed the L2/memory interface for xalanc in the secure full run).

Figure 9:
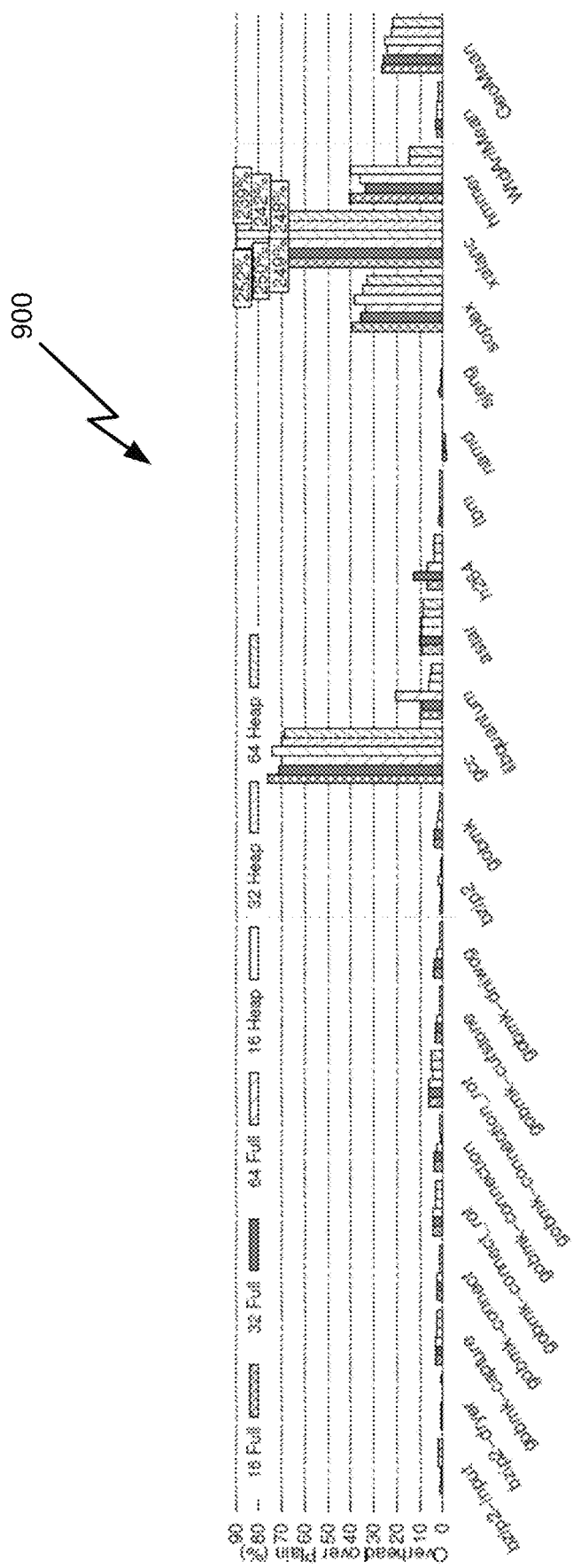
FIG. 9 includes a graph showing runtime overheads for the REST implementations using 16B, 32B, and 64B tokens in secure mode.

To distinguish between the overheads added by the software and hardware modifications, the REST-based binaries were ran on stock hardware with one key modification—each arm and disarm in the binaries was replaced by one regular store. This simulates a situation in which the REST hardware modifications for managing and checking tokens have zero cost. The runtimes for this set of experiments are shown in FIG. 9 (providing a graph 900 showing runtime overheads using 16B, 32B, and 64B tokens in secure mode) denoted by the PerfectHW Full and PerfectHW Heap bars. As the results of FIG. 9 show, the overheads incurred by the perfect REST hardware are not significantly different from that seen in the secure mode, being only 0.2% lower for full protection and only 0.03% lower for heap protection. This implies that the cost of the REST primitive in hardware is nearly zero and that the entirety of the performance overheads in the secure mode are solely an artifact of its software component, especially the allocator.

Token widths, while affecting the security of a system, might also potentially affect its performance, since smaller token widths might allow better cache utilization. In order to evaluate this, the tested implementation was configured to utilize tokens of 16B and 32B and perform the experiment for all modes. The corresponding results are also shown in FIG. 9. Overall, it can be seen that choosing any single token width does not make a significant difference in terms of performance. In the general case, users might thus freely choose robustness in the form of wider tokens, without compromising performance.

Thus, the foregoing discussion described implementations (referred to as the REST-based implementations) for content based checks. The implementations provide a low complexity, low overhead implementations for improving memory safety. REST itself requires local modifications that integrates within existing hardware interfaces. It incurs a low performance penalty for stack and heap safety, which is 22-90% faster than comparable state-of-the-art software implementations, while additionally being more secure and providing heap safety for legacy binaries.

There are many open areas of optimization and extension to REST. For example, the current software-based components of the REST implementations may be optimize, as can the repurposed Address Sanitizer allocator. These two issues account for almost all of the slowdown in the secure mode. An allocator designed to take advantage of REST properties and requirements could be significantly faster. Similarly, for the hardware portion of the implementation, the goal was to minimize number of optimizations: however, a few additional microarchitectural optimizations such as a dedicated cache for REST lines has potential to decrease overheads further, especially for the debug mode and for programs that make frequent allocations. Finally, the REST-based implementations were explored at the application level. Extending and supporting it at the system level and for heterogeneous architectures will increase system security and reliability. The benefits of REST go well beyond memory safety. As a primitive for performing content-based checks in hardware, it provides a number of opportunities not only for improving other aspects of software security (e.g., control flow), but also programmability and performance.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate in the context of the systems, devices, circuits, methods, and other implementations described herein.

As used herein, including in the claims, "or" as used in a list of items prefaced by "at least one of" or "one or more of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.). Also, as used herein, unless otherwise stated, a statement that a function or operation is "based on" an item or condition means that the function or operation is based on the stated item or condition and may be based on one or more items and/or conditions in addition to the stated item or condition.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A method comprising:
   obtaining, during execution of a process associated with a particular privilege level, data content from a memory location;
   determining by a hardware-based detection circuit whether the data content matches at least one of one or more token values, the one or more token values stored in one or more pre-determined memory locations, wherein access of any of the pre-determined one or more memory locations indicates a potential anomalous condition; and
   triggering, in response to a determination that the data content matches the at least one of the one or more token values, another process with a higher or same privilege level as the particular privilege level associated with the process, to handle occurrence of a potential system violation condition;
   wherein the hardware-based detection circuit is located at an interface between an L1 data cache memory and another memory device.

2. The method of claim 1, wherein triggering the other process comprises:
   communicating to the other process information about access of the memory location, including one or more of: a program counter value, timing information for the access of the memory location, or other information.

3. The method of claim 1, wherein determining whether the data content matches at least one of one or more token values comprises:
   setting, in response to a determination of a match of the data content to the at least one of the one or more token values, a token indicator of at least one cache memory location, or a part thereof, storing the obtained data content to an indicator value indicating the at least one cache memory location, or part thereof, stores a token value.

4. The method of claim 3, wherein triggering the other process comprises:
   generating a memory exception condition in response to determining that the token indicator of the at least one cache memory location storing the data content is set to the indicator value indicating the at least one cache memory location stores the token value.

5. The method of claim 3, wherein the token indicator of the at least one cache memory location comprises a token bit.

6. The method of claim 1, wherein the at least one of one or more token values is a value represented by a multiplier of a number of bits in a cache memory location of a cache memory executing the particular process and the other process.

7. The method of claim 1, wherein determining by the hardware-based detection circuit whether the data content matches the at least one of one or more token values comprises:
comparing, by the hardware-based detection circuit, the data content to the one or more token values stored in one or more hardware registers accessible by the hardware-based detection circuit.

8. The method of claim 1, wherein determining whether the data content matches the at least one of one or more token values comprises:
comparing portions of the data content to respective portions the at least one of the one or more token values over multiple clock cycles.

9. The method of claim 1, wherein the other memory device comprises one of: an L2 cache memory, or non-cache memory.

10. The method of claim 1, wherein at least one of the pre-determined one or more memory locations is outside a boundary of a process-accessible data structure.

11. The method of claim 1, further comprising:
executing an arm instruction to write at least some of the one or more token values into the pre-determined one or more memory locations.

12. The method of claim 1, further comprising:
randomly determining at least some of the pre-determined one or more memory locations into which to write at least some of the one or more token values.

13. The method of claim 1, wherein at least some of the one or more token values comprise randomized-generated values.

14. The method of claim 1, further comprising:
regenerating, by the triggered other process, a new token value; and
replacing content of the memory location that included the at least one of the one or more token values with the regenerated new token value.

15. A computing system comprising:
one or more memory devices;
a controller configured to obtain, during execution of a process associated with a particular privilege level, data content from a memory location at the one or more memory devices; and
a hardware-based detection circuit configured to determine whether the data content obtained from the memory location matches at least one of one or more token values, the one or more token values stored in one or more pre-determined memory locations at the one or more memory devices, wherein access of any of the pre-determined one or more memory locations indicates a potential anomalous condition;
wherein the controller is further configured to trigger, in response to a determination that the data content matches the at least one of the one or more token values, another process with a higher or same privilege level as the particular privilege level associated with the process, to handle occurrence of a potential system violation condition;
and wherein the hardware-based detection circuit is located at an interface between an L1 data cache memory and another memory device.

16. The system of claim 15, wherein the hardware-based detection circuit configured to determine whether the data content matches at least one of one or more token values is configured to:
set a token indicator of at least one cache memory location storing the obtained data content, to an indicator value indicating the at least one cache memory location stores a token value.

17. The system of claim 16, wherein the controller is further configured to:
generate a memory exception condition in response to determining that the token indicator of the at least one cache memory location storing the data content is set to the indicator value indicating the at least one cache memory location stores the token value.

18. The system of claim 15, wherein the other memory device comprises one of: an L2 cache memory, or non-cache memory.

19. The system of claim 15, wherein at least one of the pre-determined one or more memory locations is outside a boundary of a process-accessible data structure.

20. The system of claim 15, wherein the controller is further configured to:
execute arm instructions to write at least some of the one or more token values into the pre-determined one or more memory locations.

21. The system of claim 20, wherein the controller comprises a load-store queue (LSQ) circuit configured to trigger an exception condition upon determination that an arm instruction to one of the pre-determined one or more memory location is executed substantially at the same time as a read operation from the one of the pre-determined one or more memory locations.

22. The system of claim 15, wherein the controller is further configured to:
randomly determine at least some of the pre-determined one or more memory locations into which to write at least some of the one or more token values.

23. The system of claim 15, wherein the at least some of the one or more token values comprise randomized-generated values stored in one or more registers accessible by the detection circuit.

24. The system of claim 15, wherein the controller is further configured to serialize performance of arm and disarm instructions controlling placement of the one or more token values in the one or more pre-determined memory locations at the one or more memory devices such that a particular arm or disarm instruction cannot begin execution until all preceding instructions have been completed, and no new instruction can begin execution until performance of the particular arm or disarm instruction has been completed.

25. A non-transitory computer readable media storing a set of instructions, executable on at least one programmable device, to:
obtain, during execution of a process associated with a particular privilege level, data content from a memory location;
determine by a hardware-based detection circuit whether the data content matches at least one of one or more token values, the one or more token values stored in one or more pre-determined memory locations, wherein access of any of the pre-determined one or more memory locations indicates a potential anomalous condition; and trigger, in response to a determination that the data content matches the at least one of the one or more token values, another process with a higher or same privilege level as the particular privilege level associated with the process, to handle occurrence of a potential system violation condition;

wherein the hardware-based detection circuit is located at an interface between an L1 data cache memory and another memory device.

26. A method comprising:

obtaining, during execution of a process associated with a particular privilege level, data content from a memory location;

determining by a hardware-based detection circuit whether the data content matches at least one of one or more token values, the one or more token values stored in one or more pre-determined memory locations, wherein access of any of the pre-determined one or more memory locations indicates a potential anomalous condition; and triggering, in response to a determination that the data content matches the at least one of the one or more token values, another process with a higher or same privilege level as the particular privilege level associated with the process, to handle occurrence of a potential system violation condition;

wherein determining whether the data content matches at least one of one or more token values comprises:

setting, in response to a determination of a match of the data content to the at least one of the one or more token values, a token indicator of at least one cache memory location, or a part thereof, storing the obtained data content to an indicator value indicating the at least one cache memory location, or part thereof, stores a token value.

27. The method of claim 26, wherein triggering the other process comprises:

generating a memory exception condition in response to determining that the token indicator of the at least one cache memory location storing the data content is set to the indicator value indicating the at least one cache memory location stores the token value.

28. The method of claim 26, wherein determining by the hardware-based detection circuit whether the data content matches the at least one of one or more token values comprises performing one or more of:

comparing, by the hardware-based detection circuit, the data content to the one or more token values stored in one or more hardware registers accessible by the hardware-based detection circuit; or comparing, by the hardware-based detection circuit, portions of the data content to respective portions the at least one of the one or more token values over multiple clock cycles.

29. The method of claim 26, further comprising performing one or more of:

executing an arm instruction to write at least some of the one or more token values into the pre-determined one or more memory locations;

randomly determining at least some of the pre-determined one or more memory locations into which to write at least some of the one or more token values; or regenerating, by the triggered other process, a new token value, and replacing content of the memory location that included the at least one of the one or more token values with the regenerated new token value.

30. A computing system comprising:

one or more memory devices;

a controller configured to obtain, during execution of a process associated with a particular privilege level, data content from a memory location at the one or more memory devices; and a hardware-based detection circuit configured to determine whether the data content obtained from the memory location matches at least one of one or more token values, the one or more token values stored in one or more pre-determined memory locations at the one or more memory devices, wherein access of any of the pre-determined one or more memory locations indicates a potential anomalous condition;

wherein the controller is further configured to trigger, in response to a determination that the data content matches the at least one of the one or more token values, another process with a higher or same privilege level as the particular privilege level associated with the process, to handle occurrence of a potential system violation condition;

wherein the hardware-based detection circuit configured to determine whether the data content matches at least one of one or more token values is configured to:

set a token indicator of at least one cache memory location storing the obtained data content, to an indicator value indicating the at least one cache memory location stores a token value.

31. The system of claim 30, wherein the controller is further configured to perform one or more of:

generate a memory exception condition in response to determining that the token indicator of the at least one cache memory location storing the data content is set to the indicator value indicating the at least one cache memory location stores the token value;

execute arm instructions to write at least some of the one or more token values into the pre-determined one or more memory locations;

randomly determine at least some of the pre-determined one or more memory locations into which to write at least some of the one or more token values; or serialize performance of arm and disarm instructions controlling placement of the one or more token values in the one or more pre-determined memory locations at the one or more memory devices such that a particular arm or disarm instruction cannot begin execution until all preceding instructions have been completed, and no new instruction can begin execution until performance of the particular arm or disarm instruction has been completed; or regenerate, by the triggered other process, a new token value, and replacing content of the memory location that included the at least one of the one or more token values with the regenerated new token value.

32. A method comprising:

obtaining, during execution of a process associated with a particular privilege level, data content from a memory location;

determining by a hardware-based detection circuit whether the data content matches at least one of one or more token values, the one or more token values stored in one or more pre-determined memory locations, wherein access of any of the pre-determined one or more memory locations indicates a potential anomalous condition; and triggering, in response to a determination that the data content matches the at least one of the one or more token values, another process with a higher or same privilege level as the particular privilege level associated with the process, to handle occurrence of a potential system violation condition;

wherein the at least one of one or more token values is a value represented by a multiplier of a number of bits in a cache memory location of a cache memory executing the particular process and the other process.

33. The method of claim 32, wherein determining by the hardware-based detection circuit whether the data content matches the at least one of one or more token values comprises performing one or more of:

comparing, by the hardware-based detection circuit, the data content to the one or more token values stored in one or more hardware registers accessible by the hardware-based detection circuit; or comparing, by the hardware-based detection circuit, portions of the data content to respective portions the at least one of the one or more token values over multiple clock cycles.

34. The method of claim 32, further comprising performing one or more of:

executing an arm instruction to write at least some of the one or more token values into the pre-determined one or more memory locations;

randomly determining at least some of the pre-determined one or more memory locations into which to write at least some of the one or more token values; or regenerating, by the triggered other process, a new token value, and replacing content of the memory location that included the at least one of the one or more token values with the regenerated new token value.

35. A computing system comprising:

one or more memory devices;

a controller configured to obtain, during execution of a process associated with a particular privilege level, data content from a memory location at the one or more memory devices; and a hardware-based detection circuit configured to determine whether the data content obtained from the memory location matches at least one of one or more token values, the one or more token values stored in one or more pre-determined memory locations at the one or more memory devices, wherein access of any of the pre-determined one or more memory locations indicates a potential anomalous condition;

wherein the controller is further configured to trigger, in response to a determination that the data content matches the at least one of the one or more token values, another process with a higher or same privilege level as the particular privilege level associated with the process, to handle occurrence of a potential system violation condition;

wherein the at least one of one or more token values is a value represented by a multiplier of a number of bits in a cache memory location of a cache memory executing the particular process and the other process.

36. The system of claim 35, wherein the controller is further configured to:

execute arm instructions to write at least some of the one or more token values into the pre-determined one or more memory locations;

wherein the controller comprises a load-store queue (LSQ) circuit configured to trigger an exception condition upon determination that an arm instruction to one of the pre-determined one or more memory location is executed substantially at the same time as a read operation from the one of the pre-determined one or more memory locations.

37. The system of claim 35, wherein the controller is further configured to:

randomly determine at least some of the pre-determined one or more memory locations into which to write at least some of the one or more token values; or serialize performance of arm and disarm instructions controlling placement of the one or more token values in the one or more pre-determined memory locations at the one or more memory devices such that a particular arm or disarm instruction cannot begin execution until all preceding instructions have been completed, and no new instruction can begin execution until performance of the particular arm or disarm instruction has been completed.

38. The system of claim 35, herein the hardware-based detection circuit configured to determine whether the data content matches the at least one of one or more token values is configured to perform one of:

compare the data content to the one or more token values stored in one or more hardware registers accessible by the hardware-based detection circuit; or comparing portions of the data content to respective portions the at least one of the one or more token values over multiple clock cycles.

39. A method comprising:

obtaining, during execution of a process associated with a particular privilege level, data content from a memory location;

determining by a hardware-based detection circuit whether the data content matches at least one of one or more token values, the one or more token values stored in one or more pre-determined memory locations, wherein access of any of the pre-determined one or more memory locations indicates a potential anomalous condition; and triggering, in response to a determination that the data content matches the at least one of the one or more token values, another process with a higher or same privilege level as the particular privilege level associated with the process, to handle occurrence of a potential system violation condition;

wherein determining by the hardware-based detection circuit whether the data content matches the at least one of one or more token values comprises one of:

comparing, by the hardware-based detection circuit, the data content to the one or more token values stored in one or more hardware registers accessible by the hardware-based detection circuit; or comparing portions of the data content to respective portions the at least one of the one or more token values over multiple clock cycles.

40. The method of claim 39, further comprising performing one or more of:

executing an arm instruction to write at least some of the one or more token values into the pre-determined one or more memory locations;

randomly determining at least some of the pre-determined one or more memory locations into which to write at least some of the one or more token values; or regenerating, by the triggered other process, a new token value, and replacing content of the memory location that included the at least one of the one or more token values with the regenerated new token value.

41. A computing system comprising:
one or more memory devices;
a controller configured to obtain, during execution of a process associated with a particular privilege level, data content from a memory location at the one or more memory devices; and
a hardware-based detection circuit configured to determine whether the data content obtained from the memory location matches at least one of one or more token values, the one or more token values stored in one or more pre-determined memory locations at the one or more memory devices, wherein access of any of the pre-determined one or more memory locations indicates a potential anomalous condition;
wherein the controller is further configured to trigger, in response to a determination that the data content matches the at least one of the one or more token values, another process with a higher or same privilege level as the particular privilege level associated with the process, to handle occurrence of a potential system violation condition;
and wherein the hardware-based detection circuit configured to determine whether the data content matches the at least one of one or more token values is configured to perform one of:
compare the data content to the one or more token values stored in one or more hardware registers accessible by the hardware-based detection circuit; or
comparing portions of the data content to respective portions the at least one of the one or more token values over multiple clock cycles.

42. The system of claim 41, wherein the controller is further configured to perform one or more of:
randomly determine at least some of the pre-determined one or more memory locations into which to write at least some of the one or more token values; or
serialize performance of arm and disarm instructions controlling placement of the one or more token values in the one or more pre-determined memory locations at the one or more memory devices such that a particular arm or disarm instruction cannot begin execution until all preceding instructions have been completed, and no new instruction can begin execution until performance of the particular arm or disarm instruction has been completed.

43. A computing system comprising:
one or more memory devices;
a controller configured to obtain, during execution of a process associated with a particular privilege level, data content from a memory location at the one or more memory devices; and
a hardware-based detection circuit configured to determine whether the data content obtained from the memory location matches at least one of one or more token values, the one or more token values stored in one or more pre-determined memory locations at the one or more memory devices, wherein access of any of the pre-determined one or more memory locations indicates a potential anomalous condition;
wherein the controller is further configured to:
trigger, in response to a determination that the data content matches the at least one of the one or more token values, another process with a higher or same privilege level as the particular privilege level associated with the process, to handle occurrence of a potential system violation condition; and
perform one or more of:
randomly determine at least some of the pre-determined one or more memory locations into which to write at least some of the one or more token values;
serialize performance of arm and disarm instructions controlling placement of the one or more token values in the one or more pre-determined memory locations at the one or more memory devices such that a particular arm or disarm instruction cannot begin execution until all preceding instructions have been completed, and no new instruction can begin execution until performance of the particular arm or disarm instruction has been completed.

44. A computing system comprising:
one or more memory devices;
a controller configured to obtain, during execution of a process associated with a particular privilege level, data content from a memory location at the one or more memory devices; and
a hardware-based detection circuit configured to determine whether the data content obtained from the memory location matches at least one of one or more token values, the one or more token values stored in one or more pre-determined memory locations at the one or more memory devices, wherein access of any of the pre-determined one or more memory locations indicates a potential anomalous condition;
wherein the controller is further configured to:
trigger, in response to a determination that the data content matches the at least one of the one or more token values, another process with a higher or same privilege level as the particular privilege level associated with the process, to handle occurrence of a potential system violation condition;
regenerate, by the triggered other process, a new token value; and
replace content of the memory location that included the at least one of the one or more token values with the regenerated new token value.

* * * * *